(12) United States Patent
Isobe et al.

(10) Patent No.: US 7,971,505 B2
(45) Date of Patent: Jul. 5, 2011

(54) LINK ACTUATING DEVICE

(75) Inventors: Hiroshi Isobe, Iwata (JP); Keisuke Sone, Iwata (JP)

(73) Assignee: NTN Corporation, Osaka (JP)

( * ) Notice: Subject to any disclaimer, the term of this patent is extended or adjusted under 35 U.S.C. 154(b) by 1710 days.

(21) Appl. No.: 11/072,649

(22) Filed: Mar. 7, 2005

(65) Prior Publication Data

US 2005/0199085 A1    Sep. 15, 2005

(30) Foreign Application Priority Data

Mar. 11, 2004  (JP) ................................. 2004-069304
Apr. 16, 2004  (JP) ................................. 2004-121059

(51) Int. Cl.
*B25J 17/00*    (2006.01)
(52) U.S. Cl. ....................................... 74/490.05; 901/28
(58) Field of Classification Search ............... 74/490.01, 74/490.03, 490.05, 490.06; 403/53, 54, 57; 464/112, 132; 901/28, 29
See application file for complete search history.

(56) References Cited

U.S. PATENT DOCUMENTS

| | | | | | |
|---|---|---|---|---|---|
| 125,880 | A | * | 4/1872 | Clemens | 464/106 |
| 4,628,765 | A | * | 12/1986 | Dien et al. | 74/665 A |
| 4,951,521 | A | * | 8/1990 | Jacobson | 74/490.06 |
| 4,976,582 | A | * | 12/1990 | Clavel | 414/729 |
| 5,699,695 | A | * | 12/1997 | Canfield et al. | 74/490.06 |
| 5,979,264 | A | * | 11/1999 | Rosheim | 74/490.06 |
| 6,047,610 | A | * | 4/2000 | Stocco et al. | 74/479.01 |
| 6,105,455 | A | * | 8/2000 | Rosheim | 74/490.06 |
| 6,516,681 | B1 | * | 2/2003 | Pierrot et al. | 74/490.01 |
| 6,997,669 | B2 | * | 2/2006 | Kong et al. | 414/735 |
| 7,021,173 | B2 | * | 4/2006 | Stoianovici et al. | 74/490.05 |
| 7,127,962 | B2 | * | 10/2006 | Angeles et al. | 74/490.05 |
| 2002/0166404 | A1 | * | 11/2002 | Rosheim | 74/490.06 |
| 2002/0183122 | A1 | * | 12/2002 | Sone et al. | 464/112 |
| 2005/0159075 | A1 | * | 7/2005 | Isobe et al. | 446/104 |
| 2008/0028881 | A1 | * | 2/2008 | Sone et al. | 74/471 R |

FOREIGN PATENT DOCUMENTS

| | | | |
|---|---|---|---|
| JP | 01146683 A | * | 6/1989 |
| JP | 04-057696 A | | 2/1992 |
| JP | 2000-130534 A | | 5/2000 |
| JP | 2004009276 A | * | 1/2004 |

(Continued)

*Primary Examiner* — Thomas R Hannon
*Assistant Examiner* — Phillip A Johnson
(74) *Attorney, Agent, or Firm* — Arent Fox, LLP

(57) ABSTRACT

In a bearing detachment prevention structure provided in a rotation pair portion of a link mechanism, play filling-up and pre-load adjustment for the bearing are realized with ease. As a means for therefor, there is provided a link actuating device having three or more sets of link mechanisms in each of which end link members are rotatably connected to input and output members respectively arranged on the input and output sides, the respective end link members on the input and output sides being rotatably connected to intermediate link members to form four rotation pair portions, the input and output sides being geometrically the same with respect to a cross section in a central portion of each link mechanism, in which each rotation pair portion of the link mechanisms has a bearing structure consisting of two bearings, with a play filling-up means for regulating axial movement of the two bearings being provided in the rotation pair portions. Further, by appropriately determining the configuration of each component forming the link mechanisms, interference between the components during operation of the link mechanisms is prevented. As a means therefor, a beveled portion is formed on the link side peripheral end edge portion of each input member, whereby interference between the end link member and the outer peripheral surface of the rotation pair portion of each intermediate link member is prevented.

33 Claims, 17 Drawing Sheets

FOREIGN PATENT DOCUMENTS

| | | | |
|---|---|---|---|
| JP | 2004066385 A | * | 3/2004 |
| WO | WO 9511780 A1 | * | 5/1995 |
| WO | WO 03106114 A1 | * | 12/2003 |
| WO | WO 2004041486 A1 | * | 5/2004 |

* cited by examiner

LINK ACTUATING DEVICE

BACKGROUND OF THE INVENTION

The present invention relates to a link actuating device to be utilized in a link mechanism, such as a robot joint, for quickly and accurately executing an operation in a three-dimensional space, such as a complicated machining or article handling.

For example, as a link actuating device for quickly and accurately executing an operation in a three-dimensional space, such as a complicated machining or article handling, there exists an operation device equipped with a parallel link mechanism (see, for example, JP 2000-94245 A).

This operating device is equipped with a parallel link mechanism in which a plurality of links connecting a base plate and a traveling plate are caused to expand and contract in cooperation with each other, thereby varying the position and attitude of the traveling plate with respect to the base plate. By mounting a tool to the traveling plate of this parallel link mechanism and rotatably arranging a table retaining a workpiece, it is possible to freely change the position and attitude of the tool with respect to the workpiece on the table, thereby making it possible to perform a complicated machining, article handling, etc. in a three-dimensional space by the tool.

The above-mentioned parallel link mechanism has superb features for quickly and accurately executing an operation in a three-dimensional space, such as a complicated machining or article handling; for example, it allows a reduction in the mass of the movable portions, and the positioning errors of the links are made uniform in the forward end portions thereof.

However, in the above-described parallel link mechanism, the operation angle of each link is rather small, so that an attempt to set the operation range for the traveling plate large results in a rather large link length, which leads to an increase in the size of the mechanism as a whole, resulting in an increase in the device size. Further, the rigidity of the mechanism as a whole is rather low, so that there is a limitation regarding the weight of the tool that can be mounted on the traveling plate, that is, the weight capacity of the traveling plate.

To solve the problem described above, the present applicant has proposed a link actuating device equipped with a link mechanism which is of a compact construction and of high rigidity and which exhibits a large weight capacity (JP 2004-261886 A).

This link actuating device has three or more sets of link mechanisms in each of which end link members are rotatably connected to link hubs respectively provided on an input member and an output member, with the input side and output side end link members being rotatably connected to an intermediate link member, the input side and the output side being geometrically the same with respect to a cross section at the central portion of each link mechanism. Each link mechanism constitutes a three-junction chain composed of four rotation pair portions.

In this link actuating device, bearing outer rings are contained in the link hubs, and bearing inner rings are connected with the end link members to thereby embed bearing structures in the link hubs, in which a rotation transmission portion is arranged in the inner space of each of the link mechanisms, and there are provided actuators for controlling the attitude of the end link members through the rotation transmission portions; by fixing the input side link hub and driving the rotation transmission portions, the output side link hub is operated through 2 degrees of freedom.

In this link actuating device, the rotation pair portions of the link mechanisms adopt a cantilever support structure, so it is hardly to say that the link mechanisms are superior in terms of strength. Therefore, the rigidity of the link mechanisms is rather low. Further, in the rotation pair portions of the link mechanisms, grooves are formed in the link hubs, and snap rings are fit-engaged with the grooves, thereby preventing detachment of the bearings.

However, in a bearing detachment prevention structure for the rotation pair portions of a link mechanism utilizing a snap ring, there is involved an axial gap between the snap ring and the groove with which it is fit-engaged, and movement in the axial direction of the rotation pair portions is possible by an amount corresponding to this gap, resulting in rattling of the link mechanism. Further, to fill up a radial gap, it is necessary to press-fit the bearing outer ring into the link hub, so that, once assembled, the mechanism is rather difficult to dismantle. As a detachment prevention means other than the snap ring mentioned above, crimping may be adopted; in this case, however, dismantling is impossible, and no reproduction is allowed, so that sufficient care is needed in assembling, and a problem in terms of maintenance performance is also involved.

Further, in this link actuating device, for its link mechanisms to operate in a wide range without involving any interference between the components forming the link mechanisms, an appropriate contrivance is needed regarding the configuration of the components forming the link mechanisms. Further, it is also necessary for the components to be configured taking into account the assembly property and workability of the link mechanisms.

SUMMARY OF THE INVENTION

It is an object of the present invention to easily realize bearing-play filling-up and pre-load adjustment in a bearing detachment prevention structure provided in a rotation pair portion of a link mechanism.

According to the present invention, there is provided a link actuating device which has three or more sets of link mechanisms each including four rotation pair portions formed by rotatably connecting end link members to input and output members respectively arranged on input and output sides and rotatably connecting the end link members on the input and output sides to an intermediate link member, with the input and output sides being geometrically the same with respect to a cross section at the central portion of each link mechanism, wherein each rotation pair portion of the link mechanisms has a bearing structure composed of two bearings, and wherein a play filling-up means for regulating axial movement of the two bearings is provided in the rotation pair portion. Here, the term "bearing structure composed of two bearings" also includes a bearing having a double-row structure like a double-row angular ball bearing.

Here, the three or more sets of link mechanisms provided between the input and output sides have the same geometrical configuration, and the reason for providing three or more sets of such link mechanisms is to obtain a 2-degrees-of-freedom mechanism. Here, the expression: "the input and output sides being geometrically the same with respect to a cross section in the central portion of the link mechanism" means that, when the mechanism is separated into the input and output side portions by the symmetry plane of the intermediate link member, the portions on the input and output sides exhibit the same geometrical configuration.

Further, each link mechanism forms a three-joint chain composed of four rotation pair portions. The respective end link members on the input and output sides are of a spherical link structure, and the spherical link centers of the three or more sets of link mechanisms coincide with each other, and the distance from the center thereof is also the same. The axis of the rotation pair portion constituting the connecting portion of the end link member and the intermediate link member may exhibit a certain crossing angle or be parallel. It should be noted, however, that the geometrical configurations of the intermediate link members of the three or more sets of link mechanisms are the same.

In the present invention, each rotation pair portion of the link mechanisms is provided with the bearing structure including two bearings, and there is provided the play filling-up means for regulating axial movement of the two bearings, whereby it is possible to mitigate rattling of the bearings in the rotation pair portion for prolonged service life of the bearings, and, as a result, it is possible to enhance the rigidity of the link mechanism and to achieve an increase in the service life thereof. The above-mentioned term "play filling-up" means attaining a state in which rattling of the bearing is eliminated and in which no pre-load is imparted; bearing pre-load adjustment not only eliminates rattling of the bearing but helps to impart an appropriate pre-load to the bearing.

As the above-mentioned play filling-up means, it is desirable to adopt a structure in which a spacer is provided between the two bearings and the thickness of the spacer is not more than double the axial gap of the bearings. This makes it possible to mitigate rattling of the bearings without having to impart pre-load to the bearings, so that it is possible to use a miniature bearing, which has been generally rather hard to impart pre-load, whereby a reduction in the size of the link mechanism is easily achieved. When using bearings other than miniature bearings, it is possible to impart pre-load to the bearings by making the spacer thickness larger than double the axial gap of the bearings.

As the above-mentioned play filling-up means, it is desirable to adopt a structure in which a presser member pressing the outer ring end portions of the bearings is mounted to the rotation pair portion. By adopting this structure, even if the outer rings of the bearings are inserted into the rotation pair portion by clearance fit, it is possible to mitigate the rattling of the bearings by the pressurizing force due to the presser member and to achieve an improvement in assembly property.

Further, as the above-mentioned play filling-up means, it is desirable to adopt a structure in which an locking portion for pre-load adjustment or positioning is formed on the shaft of the rotation pair portion. The locking portion preferably consists of a step formed on the outer peripheral surface of the shaft of the rotation pair portion, or a step formed at at least one position at an end of the shaft of the rotation pair portion, between the two bearings, between the bearings and the end link member, or between the bearings and a rotation transmission portion. By utilizing this locking portion, it is possible to mitigate the rattling of the bearings, and to easily perform positioning and pre-load adjustment on the bearings, the end link member, etc., thereby achieving an improvement in terms of assembly property.

In the above-described construction, it is desirable to provide each rotation pair portion of the link mechanisms with a bearing structure in which two bearings are accommodated in a common housing. The two bearings are preferably arranged such that angular ball bearings are arranged back to back. This makes it possible to easily realize a rotation pair portion with a bearing structure in the form of a unit.

In the above construction, it is desirable to arrange the two bearings in the rotation pair portion so as to support each rotation pair portion of the link mechanisms at both ends, with an end link member or an intermediate link member entering the space between the two bearings. This makes it possible to effectively utilize the space between the two bearings, and to achieve space saving in the rotation pair portion, thus making the link mechanism more compact with ease.

In the above construction, it is desirable to form the connecting portion between the rotation transmission portion and the rotation pair portion and the connecting portion between the end link member and the rotation pair portion in conformity with the phases of the end link member and the rotation transmission portion, and each of the connecting portions is preferably so constructed that two flat portions are formed on the shaft of the rotation pair portion so as to be out of phase with each other. This facilitates the setting of the positional relationship.

The structure in which the rotation pair portion of the link mechanisms is supported at both ends is preferably formed by adding a reinforcing member to the shaft of the rotation pair portion provided on each of the input and output members. This makes it possible to easily effect bearing play filling-up and imparting of pre-load, and, further, to realize a structure superior in terms of strength.

The rotation pair portion is preferably provided with a construction equipped with a bearing with a shafted inner ring allowing pre-load adjustment or play filling-up, and, further, an outer ring of the bearing with the shafted inner ring is preferably equipped with a flange. This makes it possible to easily perform bearing play filling-up and imparting of pre-load.

Another object of the present invention is to prevent interference of the components with each other during operation of the link mechanism by regulating the configuration of each component constituting the link mechanism.

According to the present invention, there is provided a link actuating device which has three or more sets of link mechanisms each including four rotation pair portions formed by rotatably connecting end link members to input and output members respectively arranged on input and output sides and rotatably connecting the end link members on the input and output sides to an intermediate link member, with the input and output sides being geometrically the same with respect to a cross section at the central portion of each link mechanism, wherein, of the components of each link mechanism including the input and output members and the end link member or the intermediate link member, at least one component has such a configuration that prevents interference with other components during operation of the link mechanisms.

As a means for forming the components of the link mechanism constructed as described above in such a form as will prevent interference with other components during operation of the link mechanisms, it is possible to form, on the link-side outer peripheral edge portion of the input member or the output member, a beveled portion for preventing interference of the end link member with the outer peripheral surface of the intermediate link side rotation pair portion. This beveled portion has a tapered surface such that its beveling angle F satisfies the condition: $F=(\theta max-\gamma)/2$, where $\theta max$ is the maximum bending angle of the link mechanisms, and $\gamma$ is the shaft angle of the intermediate link member.

As another interference preventing means, it is possible to adopt a construction in which, assuming that the distance between the inner end surface of the intermediate link side rotation pair portion of the end link member and the axial center of the input/output side rotation pair portion is S, and that the distance between the outer peripheral surface of the intermediate link side rotation pair portion of the end link member and the axis of the intermediate link side rotation pair portion is B, the configuration of the input/output member is, based on a rotation angle $E=(\theta max-\gamma)/2$ at which the end link member comes closest to the input/output member, determined such that an outer dimension Q for preventing interference of the end link member with the outer peripheral surface of the intermediate link side rotation pair portion satisfies the condition: $Q \leq \{S-B \cdot \tan(E)\} \cdot \cos(E)$.

As another interference preventing means, it is possible to adopt a construction in which there is provided in the input/output member a spacer for preventing the end link member from interfering with the outer peripheral surface of the input/output side rotation pair portion. In this case, it is desirable that, assuming that the distance between the outer end surface of the intermediate link side rotation pair portion of the end link member and the axial center of the input/output side rotation pair portion is R, and that the distance from the surface joined to the spacer to the axial center of the input/output side rotation pair portion of the end link member is D, a thickness G of the spacer be determined so as to satisfy the condition: $G \geq \{R \cdot \sin(E) + B \cdot \cos(E)\} - D$.

As another interference preventing means, it is possible to adopt a construction in which the end link member has a curved arm-shaped configuration, and in which, on the outer edge portion of the curved portion thereof, there is formed a beveled portion for preventing interference between the input and output side end link members in the same link.

Further, it is possible to adopt a construction in which there is formed, on each of the outer end surfaces of the intermediate link side rotation pair portion of the input side end link and the intermediate link side rotation pair portion of the output side end link member, a beveled portion for preventing interference between the rotation pair portions of the two end link members. Assuming that the shaft angle of the intermediate link member is $\gamma$, the beveled portion has a tapered surface satisfying the condition: $H=\gamma/2$, where H is the beveling angle.

As another interference preventing means, it is possible to adopt a construction in which the intermediate link member with the rotation pair portion supporting the end link member at both ends is partially slimmed down in conformity with the rotation range of the end link member with respect to the intermediate link member, forming a slimmed portion for preventing interference between the intermediate link member and the end link member. This slimmed portion has a tapered surface at a minimum angle Tmin that the intermediate link member and the end link member form when folded together. In this case, the minimum angle Tmin can be obtained as follows: $Tmin=\sin^{-1}(\{\tan(\gamma/2)/\tan((\theta max+\gamma)/2)\}^{0.5})$, where $\theta max$ is the maximum bending angle of the link mechanism and $\gamma$ is the shaft angle of the intermediate link member. Further, a rotation range T for the end link member with respect to the intermediate link member is obtained as follows: $T=2\times(90-Tmin)$.

As described above, in the link actuating device of the present invention, of the components of the link mechanism composed of the input and output members and the end link member or the intermediate link member, at least one component has such a configuration as will prevent interference with other components during operation of the link mechanism, whereby it is possible to prevent interference of the components of the link mechanism and to secure a reduction in the size of the link mechanism.

Further, according to the present invention, there is provided a link actuating device which has three or more sets of link mechanisms each including four rotation pair portions formed by rotatably connecting end link members to input and output members respectively arranged on input and output sides and rotatably connecting the end link members on the input and output sides to an intermediate link member, the input and output sides being geometrically the same with respect to a cross section at the central portion of each link mechanism, in which, of the components of each link mechanism including the input and output members and the end link member or the intermediate link member, at least one component has a flat portion that is optimum for machining or assembly of the component.

That is, the end link member has a curved arm-shaped configuration, and it is possible to adopt a construction in which the flat portion is formed in a tapered configuration on the inner side of the connecting portion of the intermediate link side rotation pair portion situated at the arm forward end, or a construction in which the flat portion is formed on the outer peripheral surface of the input member or the output member and on a portion situated between the outer peripheral surface and the rotation pair portion related to the end link member, constituting a vertical flat surface with respect to the rotation pair portion between the flat portion and the opposing end link member.

As described above, in the link actuating device of the present invention, of the components of the link mechanism including the input and output members and the end link member or the intermediate link member, at least one component has a flat portion optimum for the machining or assembly of the component, thereby achieving an improvement in the workability and assembly property of the components of the link mechanism.

DESCRIPTION OF THE PREFERRED EMBODIMENTS

Figure 1:
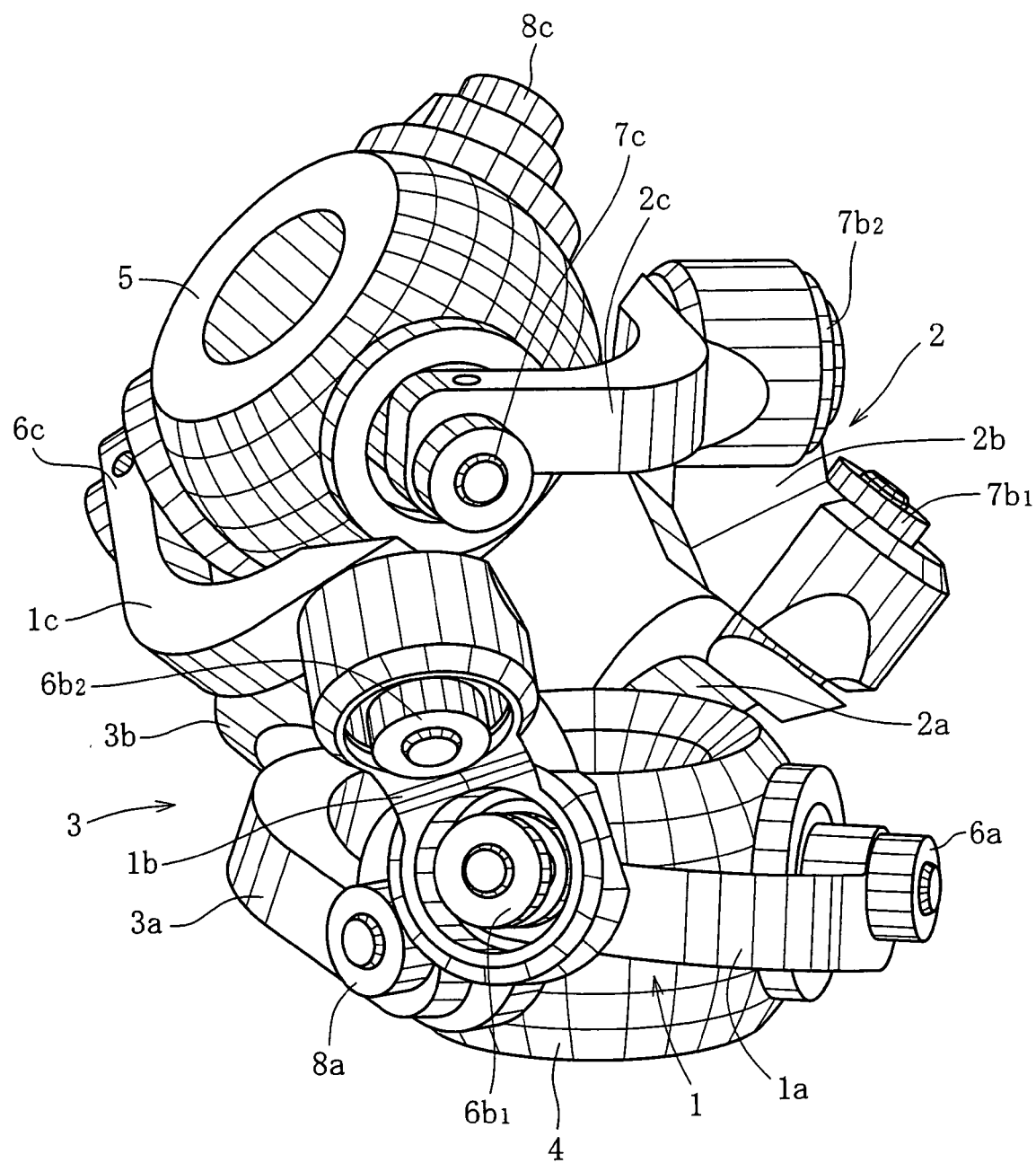
FIG. 1 is a perspective view of a cantilever-support type link actuating device equipped with three sets of link mechanisms according to an embodiment of the present invention.
Figure 2:
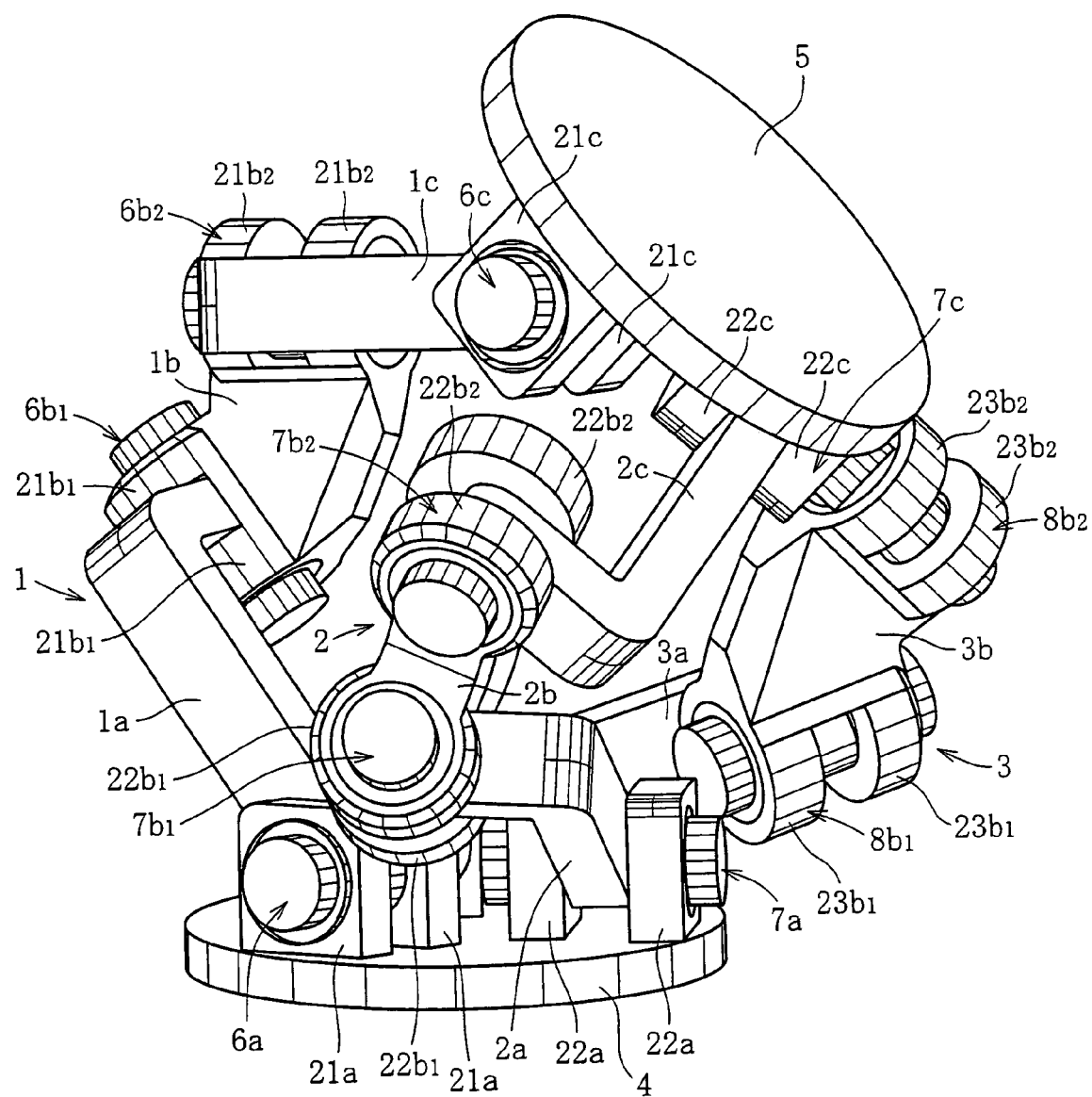
FIG. 2 is a perspective view of a both-end-support type link actuating device equipped with three sets of link mechanisms according to an embodiment of the present invention.

A link actuating device of an embodiment shown in FIGS. 1 and 2 is equipped with three sets of link mechanisms 1 through 3 to be utilized, for example, in link mechanisms, such as robot joints, for quickly and accurately executing an operation, such as a complicated machining or article handling in a three-dimensional space. The three sets of link mechanisms 1 through 3 are of the same geometrical configuration.

The link mechanisms 1 through 3 of the embodiment shown in FIG. 1 are of the rotation symmetry type. The positional relationship between an input member 4 and input side end link members 1a through 3a, and the positional relationship between an output member 5 and output side end link members 1c through 3c, are in rotation symmetry with each other with respect to the center lines of intermediate link members 1b through 3b.

As shown in FIGS. 1 and 2, the link mechanisms 1 through 3 are respectively composed of the input side end link members 1a through 3a rotatably connected to the input member 4, output side end link members 1c through 3c rotatably connected to the output member 5, and intermediate link members 1b through 3b rotatably connected to the end link members 1a through 3a and 1c through 3c and connecting the end link members 1a through 3a and the 1c through 3c and connecting the end link members 1a through 3a and 1c through 3c to each other, forming a three-junction chain structure composed of four rotation pair portions 6a through 8a, 6b through 8b, $6b_1$, $6b_2$ through $8b_1$, $8b_2$, and 6c through 8c.

Each of the rotation pair portions 6a through 8a, 6b through 8b, $6b_1$, $6b_2$ through $8b_1$, $8b_2$, and 6c through 8c of the link mechanisms 1 through 3 of FIGS. 1 and 2 contains a bearing structure. This helps to restrain frictional resistance in the connection portions to reduce rotational resistance, and makes it possible to secure smooth power transmission and to achieve an improvement in durability. As the bearing structure, it is possible to use two radial ball bearings, an angular ball bearing, a roller bearing, a slide bearing, one double-row angular ball bearing, or the like.

The end link members 1a through 3a and 1c through 3c are of a spherical surface link structure. The spherical surface link centers of the three sets of link mechanisms 1 through 3 coincide with each other, and the distances from the centers are the same. Connection shafts of the rotation pair portions $6b_1$, $6b_2$ through $8b_1$, $8b_2$ of the end link members 1a through 3a and 1c through 3c and the intermediate link members 1b through 3b may be at a certain cross angle with each other or parallel to each other. It should be noted, however, that the geometrical configurations of the intermediate link members 1b through 3b of the three sets of link mechanisms 1 through 3 are the same.

In the link mechanisms 1 through 3, when the geometrical configurations of the end link members 1a through 3a and 1c through 3c are the same on the input side and the output side, and the intermediate link members 1b through 3b are also of the same configuration on the input side and the output side, by making the angular positional relationship between the intermediate link members 1b through 3b and the end link members 1a through 3a and 1c through 3c connected to the input and output members 4 and 5 the same on the input side and the output side with respect to the symmetry planes of the intermediate link members 1b through 3b, the input member 4 and the input side end link members 1a through 3a move in the same manner as the output member 5 and the output side end link members 1c through 3c due to the geometrical symmetry, and the input side and the output side are of the same rotation angle and make uniform rotation. The symmetry planes of the intermediate link members 1b through 3b at the time of this uniform rotation are referred to as uniform bisection planes.

Thus, by arranging in a circumference a plurality of link mechanisms 1 through 3 of the same geometrical configuration sharing the input and output members 4 and 5, movement of the intermediate link members 1b through 3b are restricted within the uniform bisection planes as positions allowing the plurality of link mechanisms 1 through 3 to move without any contradiction, whereby it is possible to achieve uniform rotation even if the input side and the output side assume arbitrary operation angles.

In the link actuating device of this embodiment, actuators, such as motors, are connected to the rotation pair portions 6a through 8a of the input side end link members 1a through 3a, and the rotation angular positions of the end link members 1a through 3a are controlled by the actuators, whereby the attitude of a movable portion of a robot arm or the like (not shown) mounted to the output member 5 is controlled.

The basic construction of the link mechanisms 1 through 3 shown in FIG. 1 is the same as that proposed by the present applicant previously and disclosed in JP 2004-261886 A. The input and output members 4 and 5 are donut-shaped link hubs which have through-holes extending along their central axes and whose outer configuration is spherical. The rotation pair portions 6a through 8a, 6b$_1$, 6b$_2$ through 8b$_1$, 8b$_2$, and 6c through 8c of the link mechanisms 1 through 3 have a construction in which the end link members 1a through 3a and 1c through 3c are supported in a cantilever-like fashion.

On the other hand, the basic construction of the link mechanisms 1 through 3 shown in FIG. 2 is the same as that previously proposed by the present applicant and disclosed in Japanese Patent Application No. 2003-388307. The input and output members 4 and 5 are formed in a disc-like configuration. The rotation pair portions 6a through 8a, 6b$_1$, 6b$_2$ through 8b$_1$, 8b$_2$, and 6c through 8c of the link mechanisms 1 through 3 have a construction in which the end link members 1a through 3a and 1c through 3c are supported at both ends.

Figure 3:
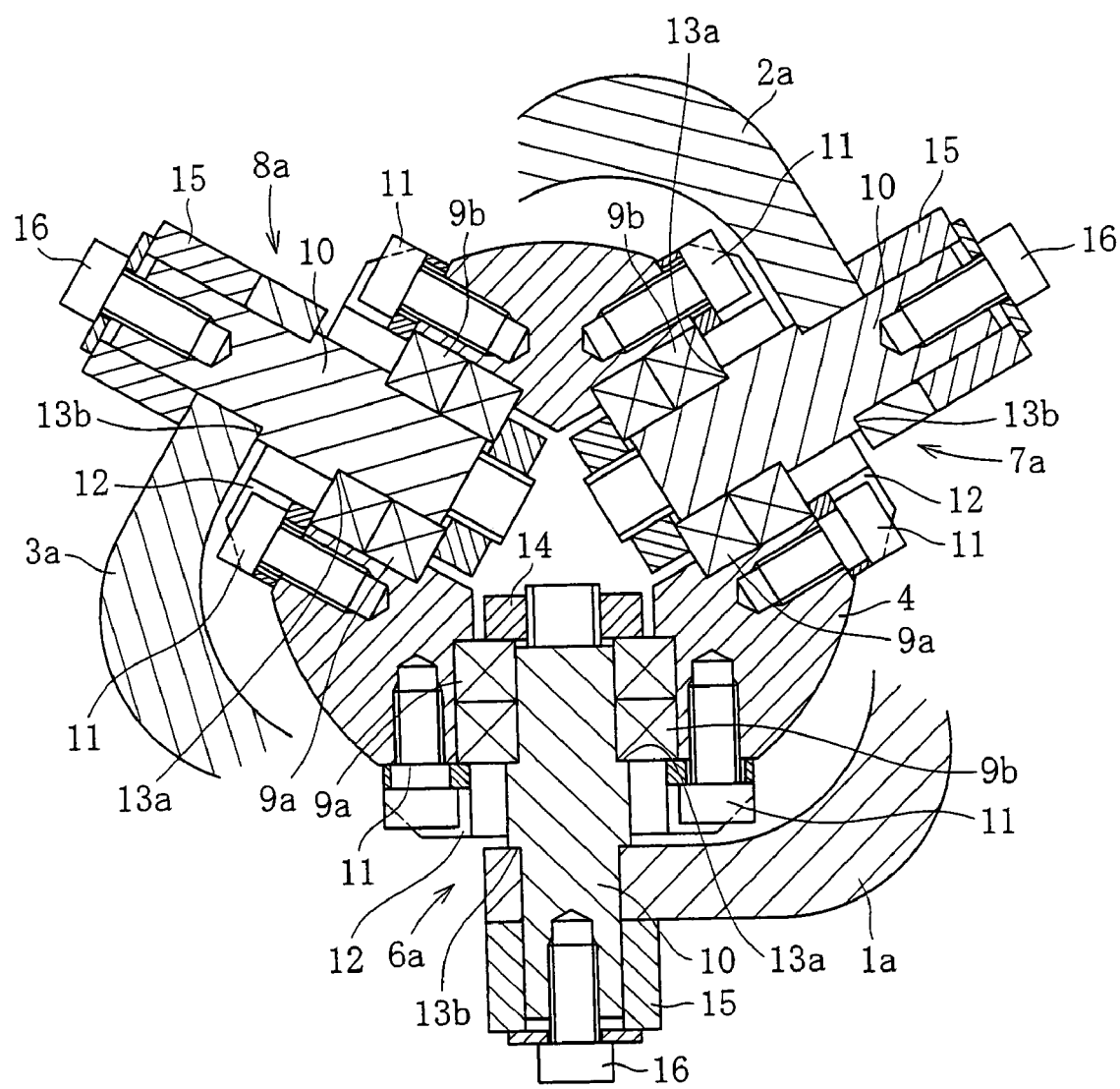
FIG. 3 is a sectional view of rotation pair portions of input members and input side end link members of the link actuating device of FIG. 1.

FIG. 3 shows the rotation pair portions 6a through 8a, which are the portions connecting the input member 4 and the input side end link members 1a through 3a in the embodiment shown in FIG. 1. The input member 4 shown in FIG. 3 has a construction in which through-holes are formed in the radial direction thereof at equal circumferential intervals, with a shaft 10 being inserted into each through-hole through the intermediation of two bearings 9a and 9b. Although not shown, the bearings 9a and 9b are composed of bearing outer rings fitted into through-holes of the input member 4, bearing inner rings fitted onto the shafts 10, and rolling members, such as balls rotatably provided between the bearing outer rings and the bearing inner rings. Due to this bearing structure, it is possible to restrain the frictional resistance at the connection portions and to reduce the rotational resistance, making it possible to secure smooth power transmission and to achieve an improvement in durability.

The portions of the outer peripheral surface of the input member 4 around the through-holes are formed in a flat configuration, and screw wholes are provided in the portions. By threadedly engaging bolts 11 with the screw holes, presser members 12 are attached to the input member 4. The presser members 12 abut the outer rings of the bearings 9b existing between the input member 4 and the shafts 10. By pressurizing the outer ring end portions of the bearings 9b through fastening of the bolts 11, it is possible to obtain a detachment preventing structure for the bearings 9a and 9b.

By making the end surfaces of the bearings 9b flush with the outer peripheral surface of the input member 4 or allowing them to slightly protrude therefrom, even if the outer rings of the bearings 9a and 9b are inserted into the input member 4 by clearance fit, it is possible to mitigate rattling of the bearings 9a and 9b through pressurization by the presser members 12. Since the presser members 12 are fixed by bolting, the bearings 9a and 9b can be attached and detached, and the assembly performance of the rotation pair portions 6a through 8a is also improved. Further, the outer diameter of the input member 4 can also be reduced, making it possible to achieve a reduction in the size of the link mechanisms 1 through 3.

Figure 4:
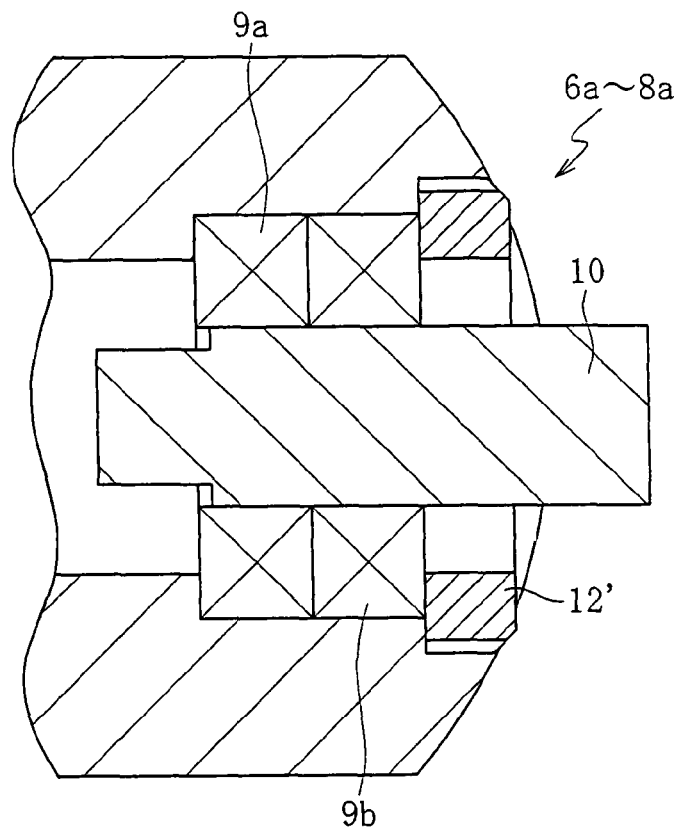
FIG. 4 is an enlarged main portion sectional view of another example of the rotation pair portions of FIG. 3.

As the bearing structure, it is possible to use two radial ball bearings, an angular ball bearing, a roller bearing, a slide bearing, a single double-row angular ball bearing, or the like. The output member 5 is of the same construction as the input member 4 of FIG. 3. While it is not necessary for the shafts 10 to be arranged at equal circumferential intervals, the input and output members 4 and 5 must be arranged in the same circumference. The input and output members 4 and 5 are shared by the three sets of link mechanisms 1 through 3, and the end link members 1a through 3a and 1c through 3c are connected to each of the shafts 10. Further, while in the above-described example fastening of the bolts 11 is adopted as a means for mounting the presser members 12 to the input member 4, it is also possible, as shown in FIG. 4, to provide taps in the openings of the through-holes of the input member 4, and to threadedly engage screw-like presser members 12' with these portions, thereby pressing the outer rings of the bearings 9a and 9b.

In the rotation pair portions 6a through 8a shown in FIG. 3, two locking portions, such as steps 13a and 13b, are provided in the middle portion of each shaft 10. Positioning is effected on the shafts 10 themselves by the steps 13a situated on the inner side, and the bearings 9a and 9b are fixed at the end portions of the shafts 10 through fastening of nuts 14. Positioning is effected on the end link members 1a through 3a by the steps 13b situated on the outer side, and the end link members 1a through 3a are fixed by fastening of bolts 16 together with rotation transmission members 15 attached to the outer sides of the end link members 1a through 3a. The above-mentioned rotation transmission members 15 constitute part of a rotation transmission portion connected with an actuator for driving the end link members 1a through 3a.

As a means for fastening the bearings 9a and 9b, the end link members 1a through 3a, and the rotation transmission members 15, it is also possible to adopt crimping or the like apart from the above-mentioned nuts and bolts. In this case, the bearings 9a and 9b are first placed on the shafts 10 by utilizing the steps 13a situated on the inner side, and then the bearings 9a and 9b are inserted into the input member 4. Thereafter, the bearings 9a and 9b are fixed to the input member 4 by means of the presser members 12, and then the end link members 1a through 3a and the rotation transmission members 15 can be mounted, making it easy to mount the bearings 9a and 9b to the input member 4.

As the rotation transmission members 15, bevel gears, worm gears, or the like are used, and are connected to the actuator (not shown) for driving the link mechanisms 1 through 3. Set screws, D-cuts, or the like may be used as baffles for the end link members 1a through 3a and 1c through 3c and the rotation transmission members 15 with respect to the shafts 10.

Figure 5:
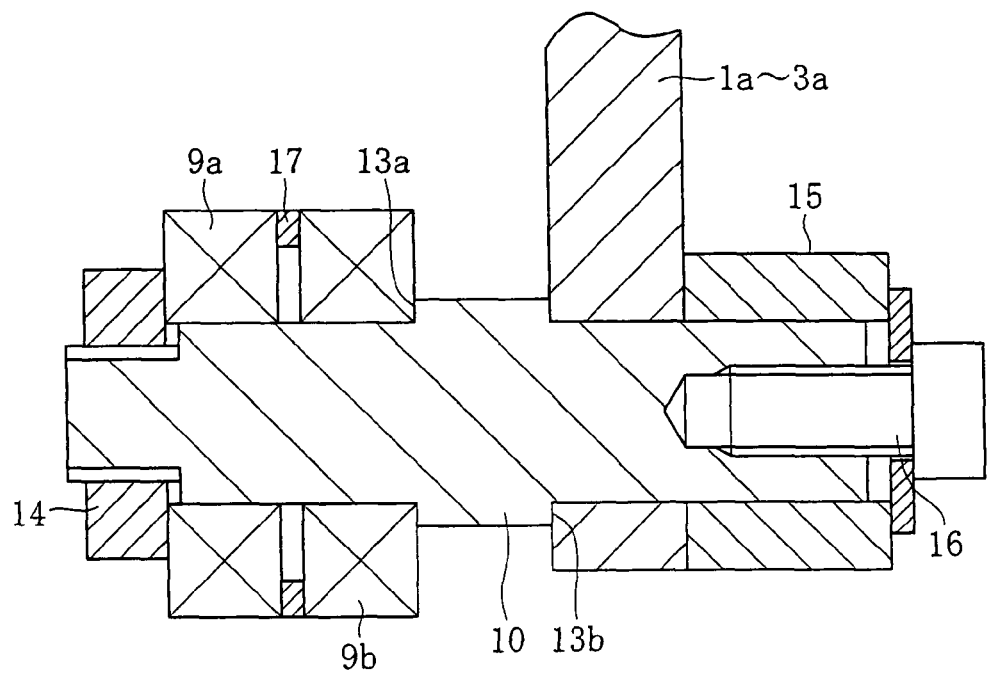
FIG. 5 is an enlarged main portion sectional view of another example of the bearing structure of the rotation pair portions of FIG. 3.

FIG. 5 shows a structure in which a spacer 17 is provided between the above-mentioned two bearings 9a and 9b. By setting the thickness of this spacer 17 less than the double of that of the axial gap, it is possible to mitigate rattling of the bearings 9a and 9b and achieve an enhancement in rigidity without applying any pre-load to the bearings 9a and 9b through fastening of the nut 14. By adopting this structure, it is possible to use a miniature bearing to which it has been conventionally generally hard to apply pre-load, thereby facilitating a reduction in the size of the link mechanisms 1 through 3.

Figure 6:
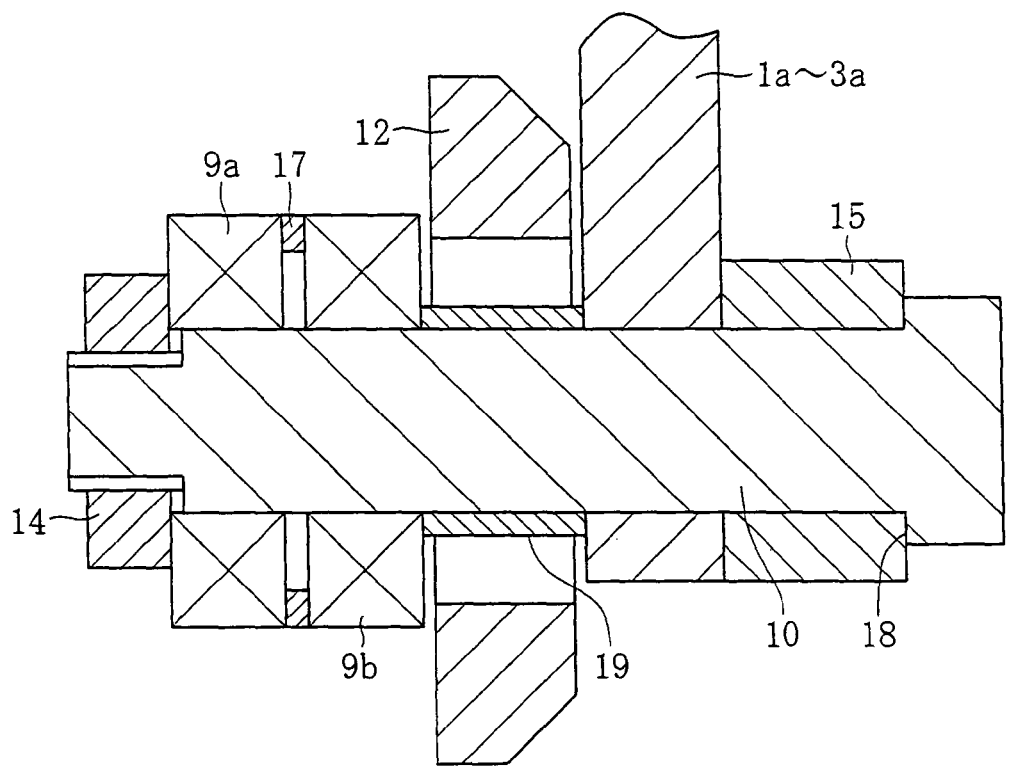
FIG. 6 is an enlarged main portion sectional view of another example of the rotation pair portions of FIG. 5.

FIG. 6 shows a structure in which a step 18 is provided at the outer end of each shaft 10. In this structure, the rotation transmission members 15, the end link members 1a through 3a, the spacers 19, the presser members 12, the bearings 9a and 9b, and the spacers 17 are fitted onto the shafts 10 and integrated therewith after positioning by the step 18, and then fixation through fastening of the nuts 14 is effected on the inner ends of the shafts 10. By this fixation through fastening of the nuts 14, the play of the bearings 9a and 9b can be filled up.

The spacer 19 situated between each of the end link members 1a through 3a and the bearings 9a and 9b corresponds to the steps 13a and 13b formed in the middle portion of the shaft 10 in the structure of FIG. 5. In a structure in which, contrary to the above-described one, a step is provided at the inner end of each shaft 10 and fixation through fastening of the nut is effected at the outer end of the shaft 10, it is possible to mount the bearings 9a and 9b to the input member 4 by the presser members 12, and then mount the end link members 1a through 3a and the rotation transmission members 15 to the shafts 10.

Figure 7:
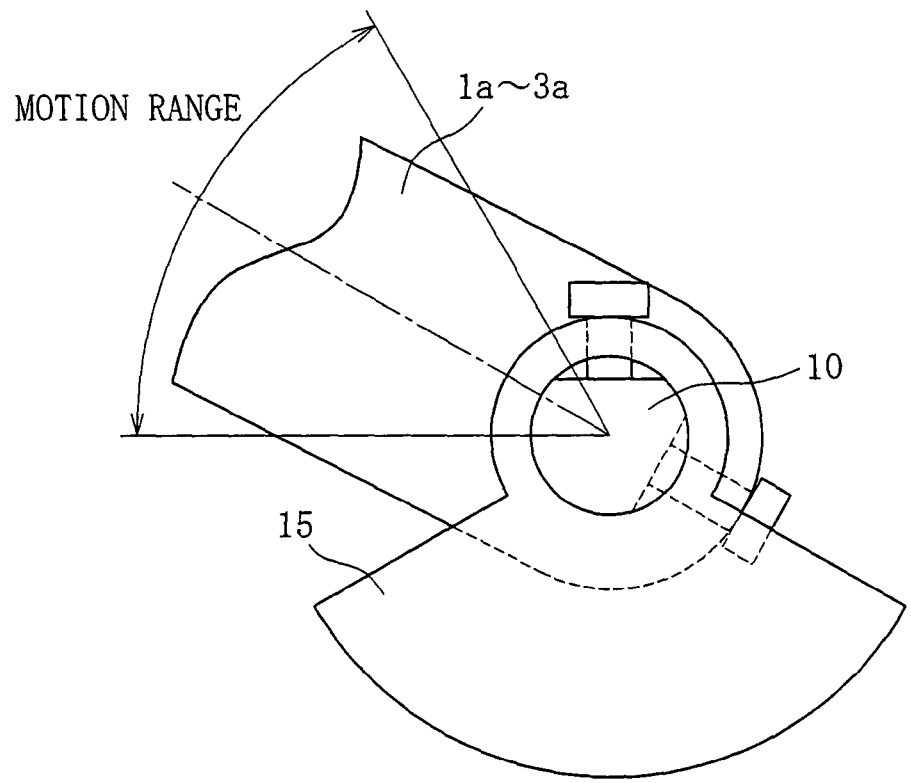
FIG. 7 is a front view for illustrating a method of fastening together the end link member of FIG. 5 and a rotation transmission portion.

As shown in FIG. 7, it is effective for the above-described rotation transmission member 15 to be of a configuration suited for the movable range of each of the end link members 1a through 3a, and it is necessary to perform assembly taking into account the positional relationship between each of the end link members 1a through 3a and the rotation transmission member 15. In this case, by providing a D-cut or the like in the shaft 10 as described above, it serves not only as a baffle for each of the end link members 1a through 3a and the rotation transmission member 15 provided, but it makes it possible to set the positional relationship between each of the end link members 1a through 3a and the rotation transmission member 15 by means of the D-cut or the like, thereby achieving an improvement in assembly performance.

Further, while in the above-described embodiment two bearings 9a and 9b are used as the bearing structure, and the spacer 17 is provided therebetween to effect play filling-up for the bearing portion with the thickness of the spacer 17, it is also possible, as another bearing structure, to use a single double-row angular ball bearing whose inner ring has a gap, effecting play filling-up on the bearing portion by means of the gap of the inner ring.

As in the link mechanisms 1 through 3 shown in FIG. 1, while the rotation pair portions 6a through 8a of the above-described embodiment adopts a structure in which the end link members 1a through 3a are supported in a cantilever-like fashion, it is also possible to apply the rotation pair portions 6a through 8a to a structure in which, as in the link mechanisms 1 through 3 shown in FIG. 2, the end link members 1a through 3a are supported at both ends. Due to the both end support structure in the rotation pair portions 6a through 8a, it is possible to achieve an improvement in bearing rigidity.

In the rotation pair portions 6a through 8a of this both end support structure, there are installed a pair of support portions 21a through 23a on the upper surface of the disc-like input member 4 for each of the link mechanisms 1 through 3 (see FIG. 2). As shown, for example, in FIG. 8, each shaft 10 is rotatably supported by the pair of support portions 21a through 23a through the intermediation of the two bearings 9a and 9b, with each of the end link members 1a through 3a being connected to the shaft 10. This structure allows formation of a bearing unit by using housings 21 through 23 formed by integrating the pair of support portions 21a through 23a. Through-holes into which the shaft 10 is to be inserted are formed in both support portions 21a through 23a of each of the housings 21 through 23.

Figure 8:
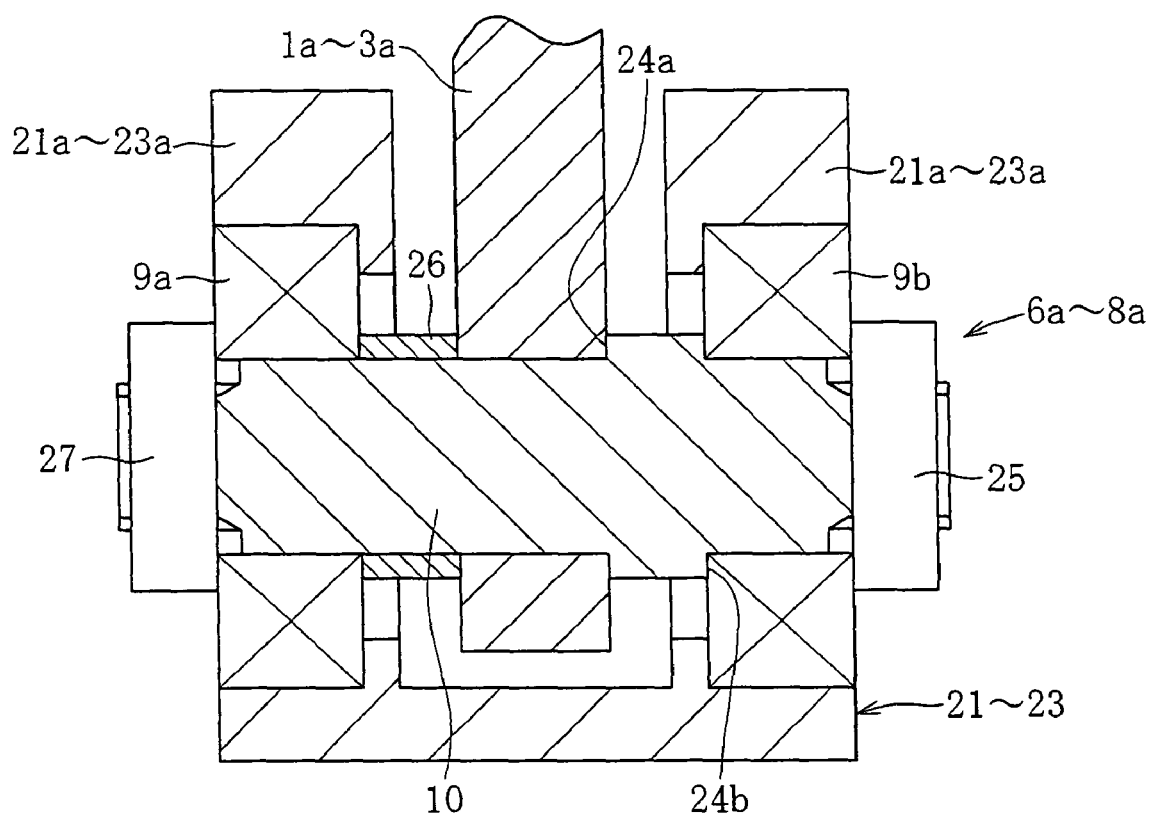
FIG. 8 is a sectional view of rotation pair portions of the input member and the input side end link member in the link actuating device of FIG. 2.

That is, in each of the rotation pair portions 6a through 8a of FIG. 8, two steps 24a and 24b are provided at positions deviated from the middle portion toward one end of the shaft 10. The shaft 10 is inserted into the through-holes of each of the housings 21 through 23, and the bearing 9b is inserted into one of each of support portions 21a through 23a and placed in position by one step 24b, thereby fixing the bearing 9b through fastening by a nut 25. Further, positioning is effected on each of the end link members 1a through 3a by the other step 24a, and a spacer 26 is inserted between each of the end link members 1a through 3a and the bearing 9a, and then the bearing 9a is inserted into the other of each of the support portions 21a through 23a, thereby fixing the bearing 9a through fastening by a nut 27.

Here, even if the outer rings of the bearings 9a and 9b are inserted into the support portions 21a through 23a by clearance fit, it is possible to mitigate rattling of the bearings 9a and 9b through fastening by the nuts 25 and 27. Further, by adjusting the distance between the step 24a and the step 24b or the width of the spacer 26, it is also possible to effect play filling-up of the bearing portion and pre-load adjustment. As stated above, by using a spacer instead of providing the steps 24a and 24b on the shaft 10, it is also possible to cause the nut 25 attached to the end of the shaft 10 to function as a step.

Figure 9:
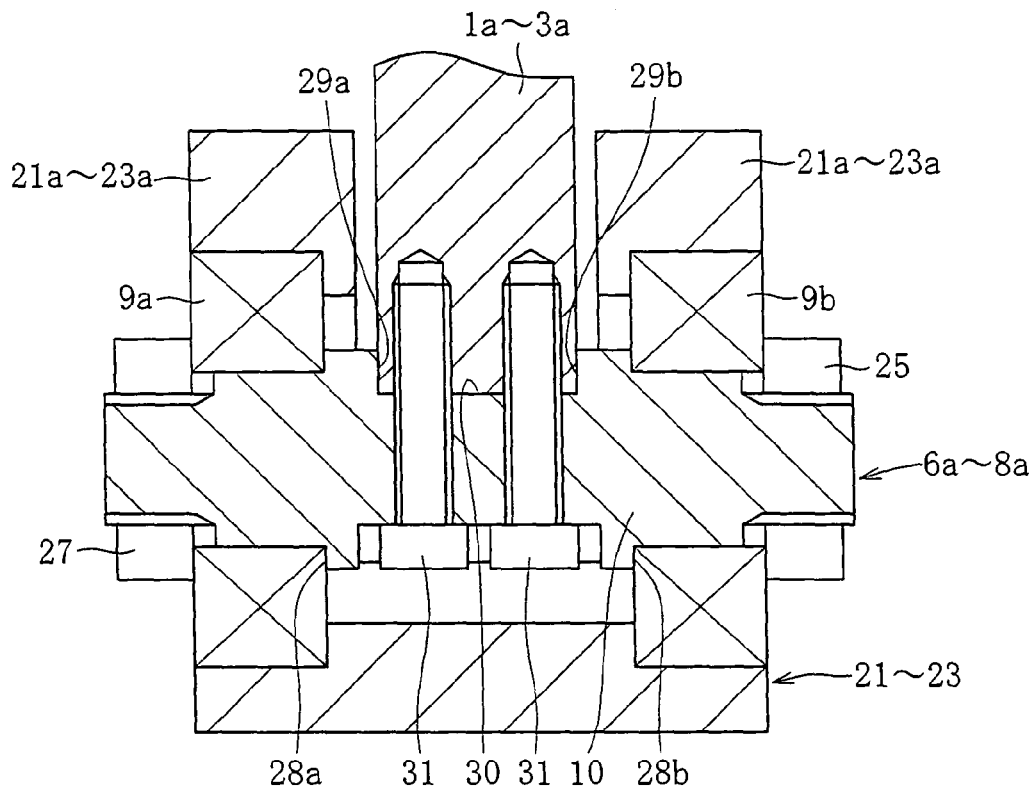
FIG. 9 is a sectional view of another example of the rotation pair portions of FIG. 8.

Further, as shown in FIG. 9, steps 28a and 28b are provided at both ends of the shaft 10, the shaft 10 is inserted into the through hole of each of the housings 21 through 23, the bearings 9a and 9b being inserted into both support portions 21a through 23a and placed in position by the steps 28a and 28b before being fixed by through fastening by the nuts 25 and 27. As in the above-describe case, even if the outer rings of the bearings 9a and 9b are inserted into the support portions 21a through 23a by clearance fit, it is possible to mitigate rattling of the bearings 9a and 9b through fastening by the nuts 25 and 27. Further, by adjusting the distance between the steps 28a and 28b, it is possible to effect play filling-up of the bearing portions or pre-load adjustment. Regarding positioning of each of the end link members 1a through 3a, a recess 30 with two axial steps 29a and 29b are formed in the middle portion of the shaft 10, and each of the link members 1a through 3a is fitted into the recess 30 and connected by bolts 31.

As the fastening means described above, it is also possible to adopt bolts or crimping other than the nuts 25 and 27. Further, as the bearings 9a and 9b, angular ball bearings may be arranged and used back to back. Further, it is also possible to arrange a rotation transmission member between the nuts 25 and 27 and the bearings 9a and 9b.

Figure 10:
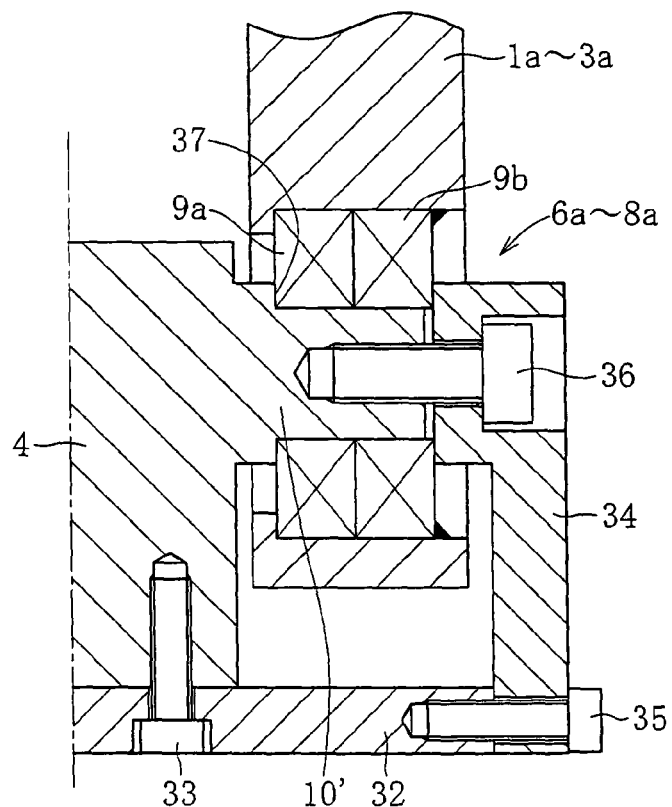
FIG. 10 is a sectional view of a both-end-support type rotation pair portion using a reinforcing member.
Figure 11:
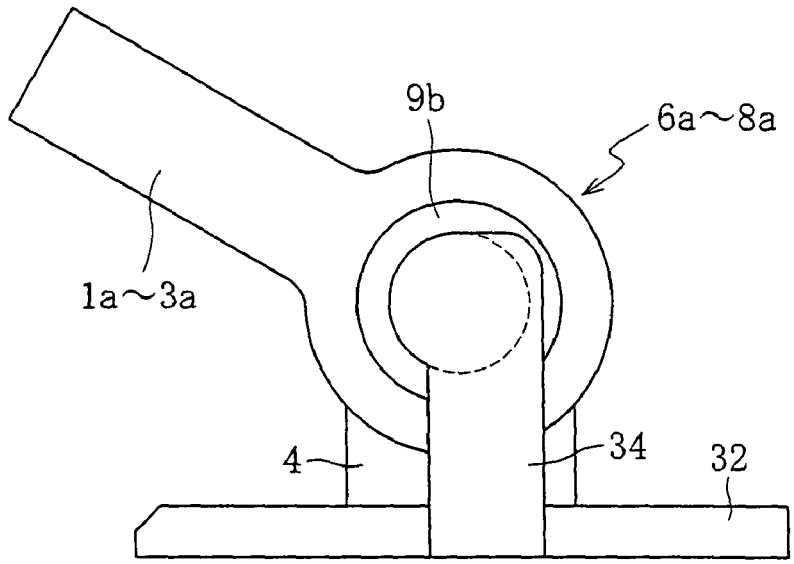
FIG. 11 is a front view of the rotation pair portion of FIG. 10.
Figure 12:
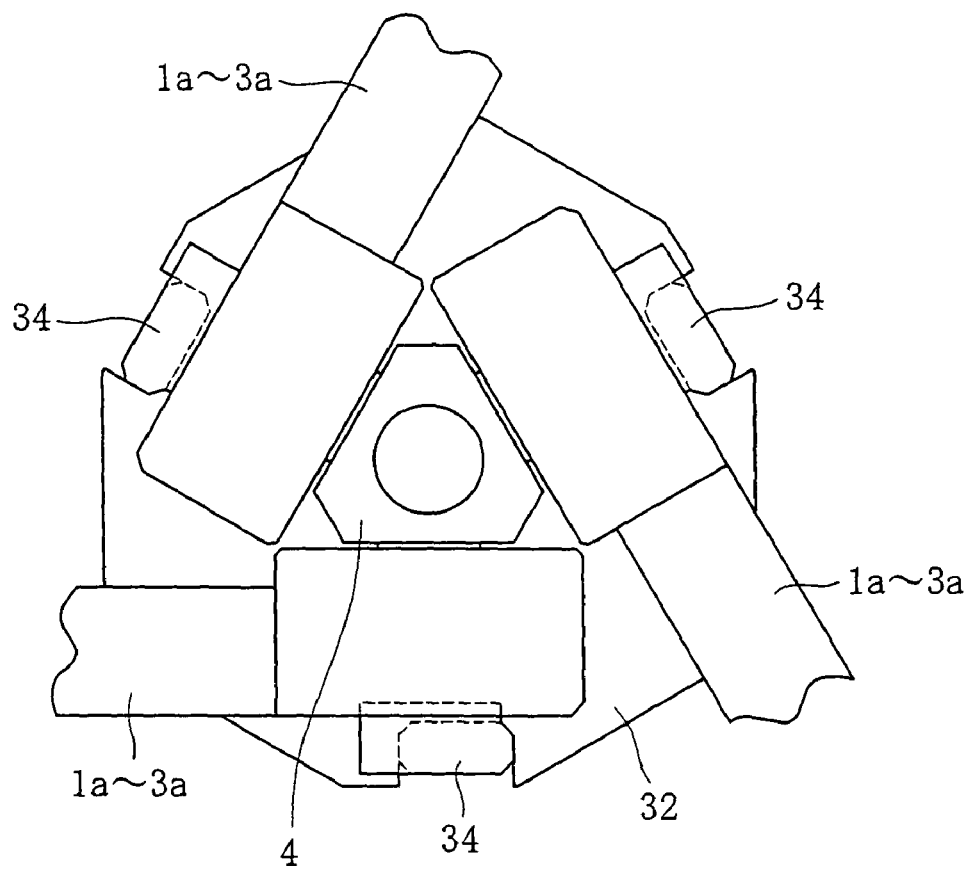
FIG. 12 is a plan view showing a state in which three rotation pair portions as shown in FIG. 11 are arranged.

FIGS. 10 through 12 show an embodiment in which the bearings 9a and 9b are incorporated into each of the end link members 1a through 3a, and a shaft 10' of each of the rotation pair portions 6a through 8a protruding sidewise from the input member 4 is reinforced by another member. In this embodiment, the input member 4 is connected to a mounting member 32 for its installation on the input side by a bolt 33, and each of the end link members 1a through 3a containing the two bearings 9a and 9b are connected to the shaft 10' of each of the rotation pair portions 6a through 8a protruding sidewise from the input member 4. The lower portion of a reinforcing member 34 is fixed to the mounting member 32 by a bolt 35, and its upper portion is fastened to the shaft 10' of each of the rotation pair portions 6a through 8a by a bolt 36, whereby each of the end link members 1a through 3a is supported at both ends, thereby providing a structure superior in strength.

In this structure, of the bearings 9a and 9b contained in each of the end link members 1a through 3a, the bearing 9a situated on the inner side is positionally regulated by a step 37 formed at the base of the shaft 10' of each of the rotation pair portions 6a through 8a, and further, since the end surface of the bearing 9b situated on the outer side protrudes beyond the end surface of the shaft 10' of each of the rotation pair portions 6a through 8a, so that, by installing a spacer (not shown) between the bearing 9a and the bearing 9b, or by adopting a double-row structure in which the bearings 9a and 9b are integrated, it is possible to effect play filling-up of the bearing structure or bearing pre-load adjustment. By making the end surface of the bearing 9b situated on the outer side flush with the end surface of the shaft 10' of each of the rotation pair portions 6a through 8a, only the play filling-up of the bearings 9a and 9b is possible.

Figure 13:
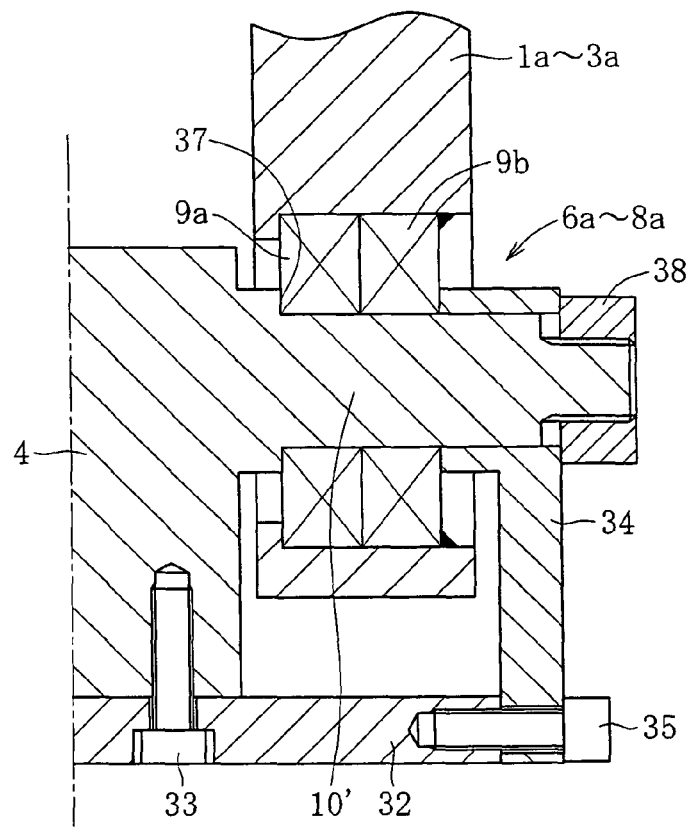
FIG. 13 is a sectional view of another example of the rotation pair portion of FIG. 10.

While in the structure of FIG. 10 the reinforcing member 34 is fastened by the bolt 36, it is also possible, instead of using the bolt 36, to extend the shaft 10' of each of the rotation pair portions 6a through 8a as shown in FIG. 13 and to form a screw at the forward end thereof, fitting the reinforcing member 34 onto the shaft 10' of each of the rotation pair portion 6a through 8a and fastening it by a nut 38. As in the embodiment of FIG. 10, the lower portion of the reinforcing member 34 is fastened to the mounting member 32 by a bolt 35.

Figure 14:
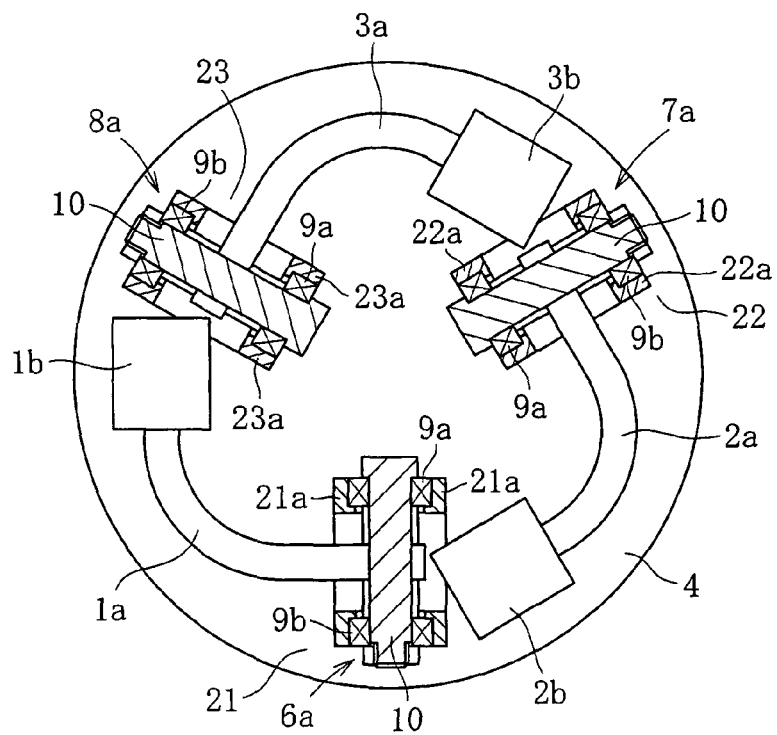
FIG. 14 is a plan view showing an example in which end link members and intermediate link members are incorporated in inter-bearing spaces of rotation pair portions.

FIG. 14 shows a structure in which each of the end link members 1a through 3a and each of the intermediate link members 1b through 3b enter the space between the bearings 9a and 9b to avoid interference. As the bearing structure, the unit structure of the above-mentioned embodiment shown in FIGS. 8 and 9 may be adopted, designing each of the housings 21 through 23 so as to make the distance between the two bearings large.

Between the two bearings 9a and 9b, there solely exist the shaft 10 of each of the rotation pair portions 6a through 8a and each of the end link members 1a through 3a, so that a vacant space is secured, whereby it is possible for each of the end link members 1a through 3a and each of the intermediate link members 1b through 3b to enter the above-mentioned space. While this bearing structure adopts the unit structure of the embodiment shown in FIGS. 8 and 9, it is also possible to install the two bearings 9a and 9b separately to the mounting member as long as a sufficient vacant space can be secured.

Figure 15:
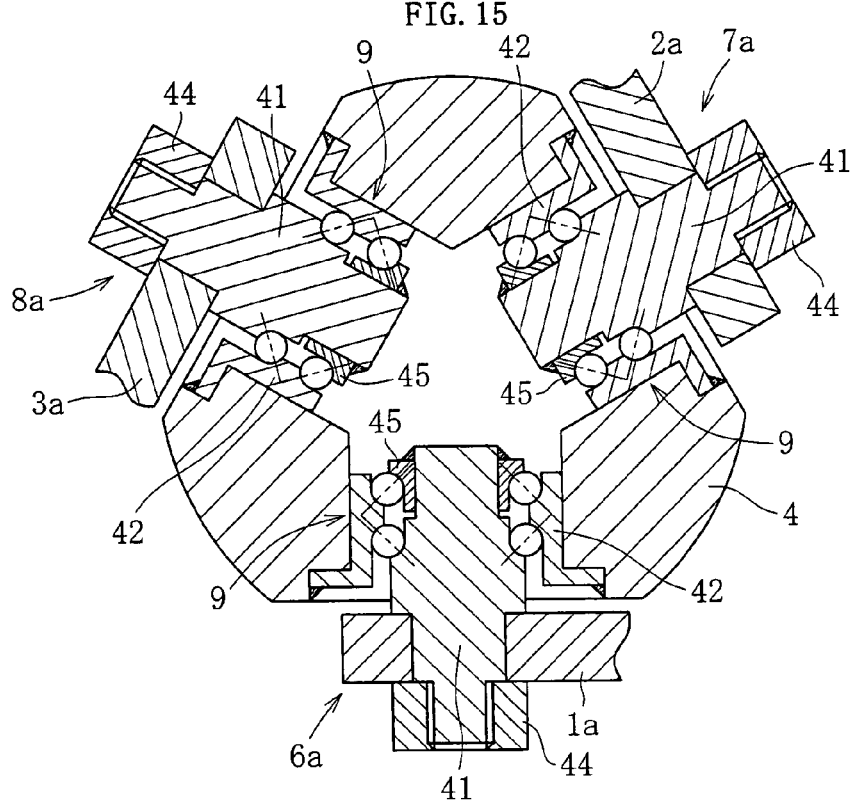
FIG. 15 is a sectional view of an example of rotation pair portions having bearing structures with inner rings with shafts.
Figure 16:
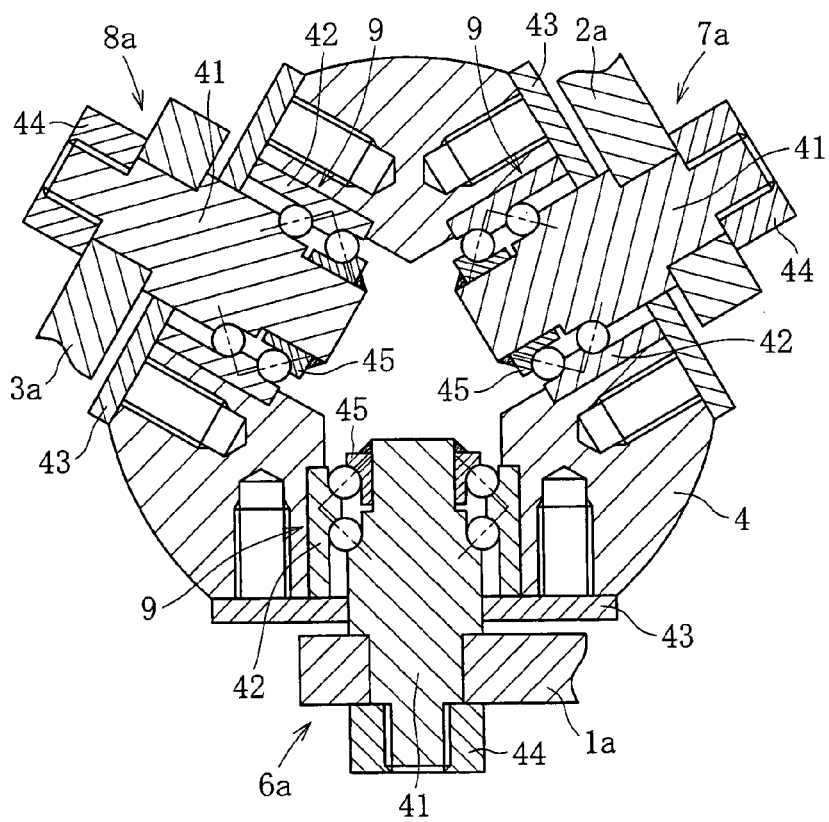
FIG. 16 is a sectional view of another example of rotation pair portions having bearing structures with inner rings with shafts.

FIGS. 15 and 16 show an embodiment in which, as another bearing structure, a double-row angular bearing 9 having a shafted inner ring 41 is used. The bearing structure shown in FIG. 15 is composed of the shafted inner ring 41 to which an inner member 45 forming a double-row angular bearing is connected by crimping, and a flanged outer ring 42 connected to the input member 4 by crimping. By connecting the inner member 45 to the shafted inner ring 41 by crimping, and by providing a space between the inner member 45 and the shafted inner ring 41, it is possible to effect play filling-up of the double-row angular bearing 9 or pre-load adjustment.

Apart from crimping, connection by a nut and a bolt is also possible. In the drawing, there is a space between the inner member 45 and the shafted inner ring 41, and the less the space becomes, the higher the rigidity of the bearing structure can be. At an end of the shafted inner ring 41, there is provided a step for positioning of each of the end link members 1a through 3a, which is fixed through fastening with a nut 44. Although not shown, at the end of the shafted inner ring 41, it is also possible to provide a rotation transmission member. As in the third embodiment, in the bearing structure shown in FIG. 16, a presser member 43 is fastened to the input member 4 by a bolt (not shown) to thereby fix the double-row angular bearing 9, making it possible to effect play filling-up of the double-row angular bearing 9 or pre-load adjustment.

While the rotation pair portions 6a through 8a of the input member 4 and the input side end link members 1a through 3a have been described above, the rotation pair portions 6c through 8c, which are the connection portions of the output member 5 and the output side end link members 1c through 3c, are of the same construction as the rotation pair portions 6a through 8a of the input member 4 and the input side end link members 1a through 3a described above, so that a redundant description thereof will be omitted.

Further, each of the rotation pair portions $6b_1$ through $8b_1$ of each of the input side end link members 1a through 3a and one end of each of the intermediate link members 1b through 3b, and each of the rotation pair portions $6b_2$ through $8b_2$, which is the connection portion of the other arm end of each of the output side end link members 1c through 3c and the other end of each of the intermediate link members 1b through 3b, are of the same construction as the rotation pair portions 6a through 8a of the input member 4 and the input side end link members 1a through 3a, and a redundant description thereof will be omitted.

Figure 17:
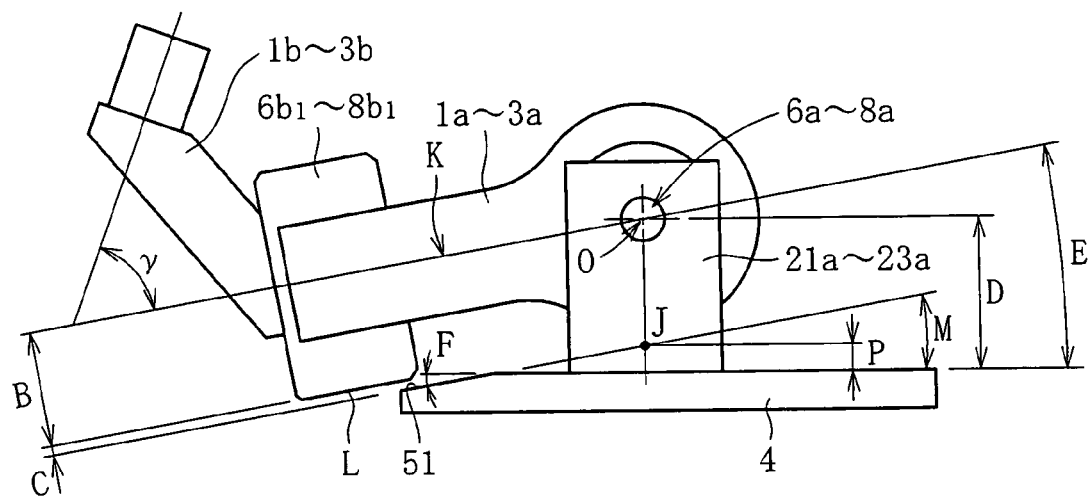
FIG. 17 is a schematic diagram showing an example in which there is provided, in the link actuating device of the embodiment shown in FIG. 2, a means for preventing interference of the rotation pair portions of the input side end link member and the central ling member with the input member.
Figure 18:
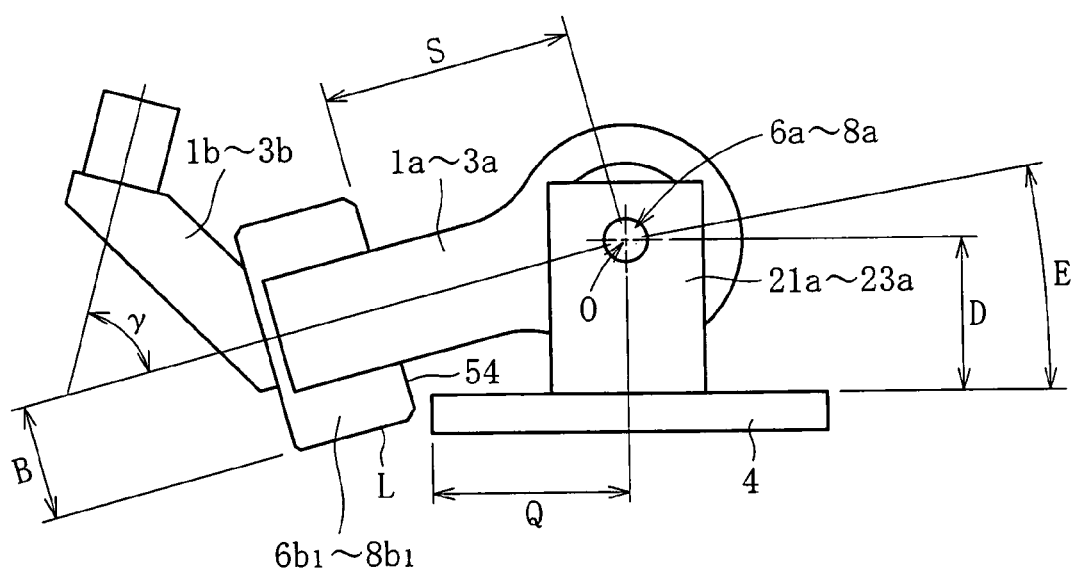
FIG. 18 is a schematic diagram showing another example in which there is provided, in the link actuating device of the embodiment shown in FIG. 2, a means for preventing interference of the rotation pair portions of the input side end link member and the intermediate link member with the input member.

FIGS. 17 and 18 shows two examples of a means for preventing interference with another component of the outer peripheral surface L of each of the rotation pair portions $6b_1$ through $8b_1$, which is the connection portion of each of the input side end link members 1a through 3a and each of the intermediate link members 1b through 3b in the link operation device of the embodiment shown in FIG. 2. While these examples are described with reference to the rotation pair portions $6b_1$ through $8b_1$ of the input side end link members 1a through 3a and each of the intermediate link members 1b through 3b, they are naturally also applicable to the rotation pair portions $6b_2$ through $8b_2$ of the output side end link members 1c through 3c and the intermediate link members 1b through 3b.

In the embodiment shown in FIG. 17, as a means for preventing interference between each of the rotation pair portions $6b_1$ through $8b_1$ at the forward end of each of the end link members 1a through 3a and the input member 4, the outer peripheral edge portion of the input member 4 is beveled such that when each of the rotation pair portions $6b_1$ through $8b_1$ of each of the end link members 1a through 3a comes closest to the input member 4, a gap C is formed between each of the rotation pair portions $6b_1$ through $8b_1$ and the input member 4. The beveled portions 51 may be formed solely at positions of the outer peripheral edge portion of the input member 4 corresponding to the directions in which the end link members 1a through 3a extend. However, it is also possible to form the beveled portions over the entire periphery of the outer peripheral edge portion of the input member 4. The angle F of each beveled portion 51 is matched with the angle M made by the upper surface of the input member 4 and the outer peripheral surface L of each of the rotation pair portions $6b_1$ through $8b_1$ of each of the end link members 1a through 3a when each of the end link members 1a through 3a comes closest to the input member 4.

Here, the rotation pair portions $6b_1$ through $8b_1$ of the intermediate link members 1b through 3b and the end link members 1a through 3a are of the bearing structures, so that, taking into account the assembly property and workability thereof, it is desirable for the outer peripheral surface L of each of the rotation pair portions $6b_1$ through $8b_1$ to be parallel with the axis K of each of the end link members 1a through 3a. The axis K of each of the end link members 1a through 3a means the intersection of the plane of each of the end link members 1a through 3a forming the vertical plane of each of the axes of the rotation pair portions 6a through 8a and a center plane of each of the end link members 1a through 3a, in which the above-mentioned center plane is a plane formed by the axis of each of the rotation pair portions 6a through 8a of the input member 4 and each of the end link members 1a through 3a and by the axis of each of the rotation pair portions $6b_1$ through $8b_1$ of each of the intermediate link members 1b through 3b and each of the end link members 1a through 3a.

In this way, if the outer peripheral surface L of each of the rotation pair portions $6b_1$ through $8b_1$ is parallel with the axis K of each of the end link members 1a through 3a, when each of the end link members 1a through 3a comes closest to the input member 4, the angle E made by the axis K of each of the end link members 1a through 3a and the upper surface of the input member 4 and the angle M made by the outer peripheral surface L of each of the rotation pair portions $6b_1$ through $8b_1$ and the upper surface of the input member 4 coincide with each other. In this regard, the angle E can be easily obtained from the maximum bending angle θmax of each of the link mechanisms 1 through 3 and the shaft angle γ of each of the intermediate link members 1b through 3b as follows: E=(θmax−γ)/2. Thus, the angle F of the beveled portions 51 may be set as F=(θmax−γ)/2.

To form the beveled portion 51 on the outer peripheral edge portion of the input member 4 in order to form the gap C between the outer peripheral surface L of each of the rotation pair portions $6b_1$ through $8b_1$ and the input member 4 so that the end link members 1a through 3a may not interfere with the input member 4, it may be designed such that the tapered surface of the beveled portion 51 formed in the outer peripheral edge portion of the input member 4 passes a point J. The point J can be easily obtained from the distance B between the axis K of each of the end link members 1a through 3a and the outer peripheral surface L of each of the rotation pair portions $6b_1$ through $8b_1$ and from the gap C. Here, assuming that the distance from the upper surface of the input member 4 to the point J is P and that the distance from an axial center O of each of the rotation pair portions 6a through 8a of the input member 4 and each of the end link members 1a through 3a to the upper surface of the input member 4 is D, P=D−(B+C)/cos(E).

In the embodiment shown in FIG. 18, as a means for preventing interference between each of the rotation pair portions $6b_1$ through $8b_1$ at the forward end of each of the end link members 1a through 3a and the input member 4, the size of the input member 4, that is, there is determined a dimension Q from the axial center O of each of the rotation pair portions 6a through 8a of the input member 4 and each of the end link members 1a through 3a to the outer peripheral surface of the input member 4 as measured in the direction in which each of the end link members 1a through 3a extends. Since the input member 4 of this embodiment is of a disc-like configuration, the radius Q of the input member 4 is determined. Assuming that the distance from the axial center O of each of the rotation pair portions 6a through 8a of the input member 4 and each of the end link members 1a through 3a to the inner end surface 54 of each of the rotation pair portions $6b_1$ through $8b_1$ of each of the intermediate link members 1b through 3b and each of the end link members 1a through 3a is S, the radius Q of the input member 4 is to be set as follows: $Q \leq \{S-B \cdot \tan(E)\} \cdot \cos(E)$.

While in this embodiment the input member 4 has a disc-like configuration, the input member 4 may also have a polygonal (e.g., a triangular) configuration, in which case the distance Q between the end surface and the axial center O is used. Further, it is also possible to provide a cutout in the interference portion, using the distance Q between the end edge of the cutout and the axial center.

Figure 19:
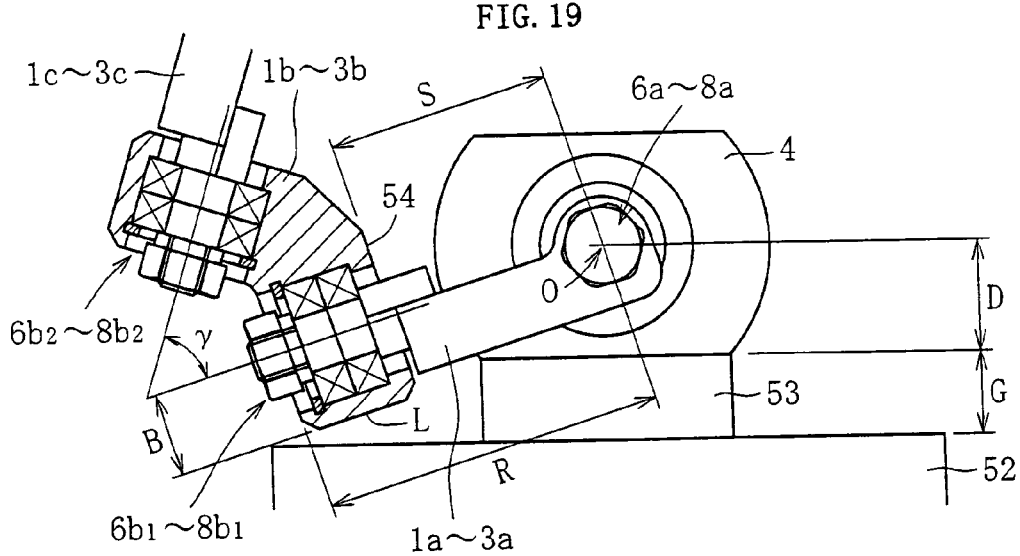
FIG. 19 is a schematic diagram showing an example in which there is provided, in the link actuating device shown in FIG. 1, a means for preventing the rotation pair portions of the input side end link member and the intermediate link member from interfering with the mounting member of the input member.

FIG. 19 shows an example of a means for preventing, in the link actuating device of the embodiment shown in FIG. 1, interference with another component of the outer peripheral surface L of each of the rotation pair portions $6b_1$ through $8b_1$, which is the connection portion of each of the input side end link members 1a through 3a and each of the intermediate link members 1b through 3b. While this example will also be described with reference to each of the rotation pair portions $6b_1$ through $8b_1$ of the input side end link members 1a through 3a and each of the intermediate link members 1b through 3b, it is naturally also applicable to each of the rotation pair portions $6b_2$ through $8b_2$ of the output side end link members 1c through 3c and each of the intermediate link members 1b through 3b.

In the embodiment shown in FIG. 19, as a means for preventing interference between each of the rotation pair portions $6b_1$ through $8b_1$ at the forward end of each of the input side end link members 1a through 3a and a mounting member 52 for the input member 4, there is provided a spacer 53 between the input member 4, which is a link hub with a donut-shaped spherical outer configuration, and the mounting member 52 for the input member 4. Due to its donut-shaped spherical outer configuration, the input member 4 does not interfere with the end link members 1a through 3a; in order to prevent interference of the input member 4 with the mounting member 52, the spacer 53 is installed.

Here, assuming that the distance from the inner end surface 54 of each of the rotation pair portions $6b_1$ through $8b_1$ of each of the intermediate link members 1b through 3b and each of the end link members 1a through 3a to the axial center O of the input member 4 and the end link members 6a through 8a is S, a thickness G of the spacer 53 may be determined as follows: $G \geq \{R \cdot \sin(E) + B \cos(E)\} - D$. As for the radius of the spacer 53, it may be set so as not to involve interference with the end link members 1a through 3a. For example, as shown in the drawing, it may be matched with the minimum lower end radius dimension of the input member 4.

FIGS. 20 through 24 show examples of a means for preventing interference of the end link members 1a through 3a and 1c through 3c with other components, and respective embodiments will be described in the following. While the respective embodiments are described as applied to the link actuating device shown in FIG. 1, they are naturally also applicable to the link actuating device shown in FIG. 2.

Figure 20:
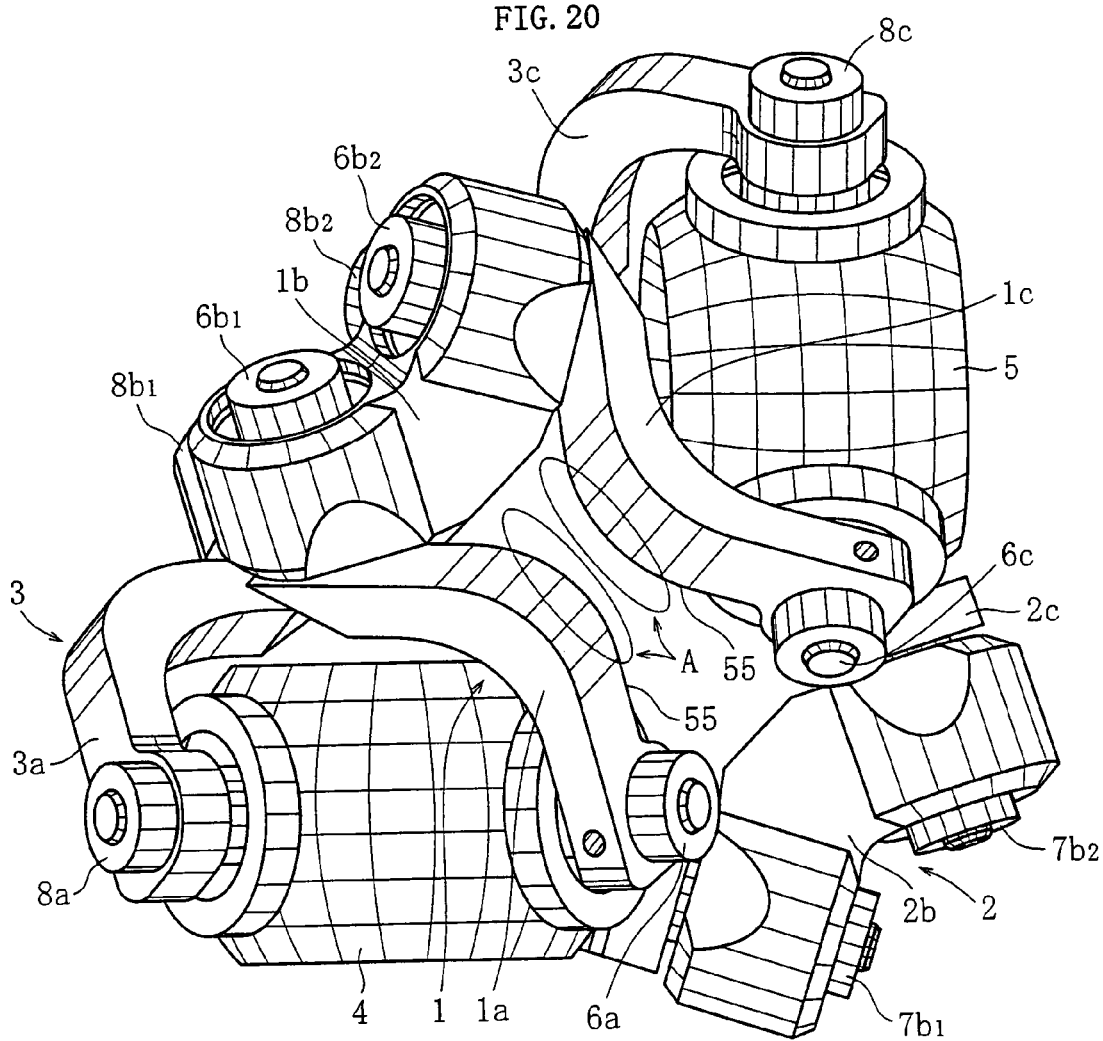
FIG. 20 is a perspective view of a state in which the link actuating device, which is in mirror symmetry with that of the embodiment shown in FIG. 1, assumes a high bending angle.

FIG. 20 shows the link mechanisms of FIG. 1 formed as a mirror symmetrical type, with the link mechanisms assuming a high bending angle (e.g., 90 degrees). In the mirror symmetrical type link mechanisms 1 through 3, the positional relationship between the input member 4 and the input side end link members 1a through 3a and the output member 5 and the output side end link members 1c through 3c is in mirror symmetry with respect to the center lines of the intermediate link members 1b through 3b.

In this embodiment, the input and output side end link members 1a through 3a and 1c through 3c are formed in a substantially L-shaped arm configuration, and have at their forward ends the rotation pair portions $6b_1$, $6b_2$ through $8b_1$, $8b_2$ with respect to the intermediate link members 1b through 3b. When the link mechanisms 1 through 3 thus assume a high bending angle, the input side end link members 1a through 3a and the output side end link members 1c through 3c in the same link come close to each other (as indicated by symbol A). Accordingly, when the length of the intermediate link members 1b through 3b is increased, it is possible to prevent interference in these portions, which, however, leads to an increase in the height of the mechanism as a whole.

Figure 21:
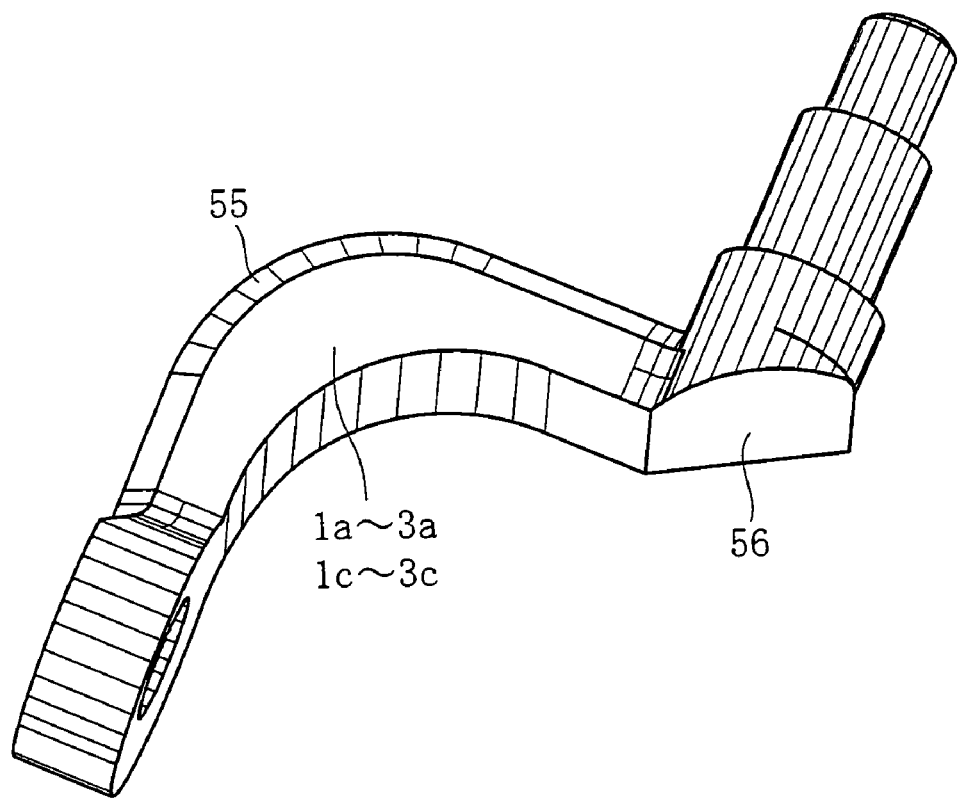
FIG. 21 is a perspective view of an end link member in which there is adopted an example of a means for preventing interference of end link members with each other.
Figure 22:
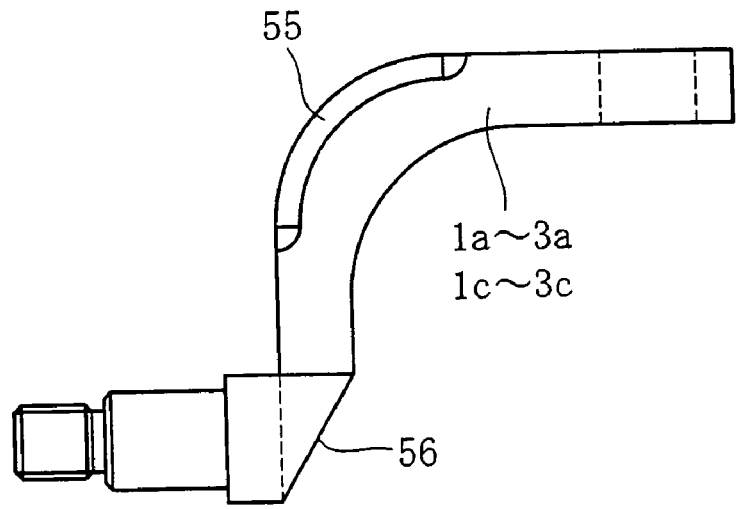
FIG. 22 is a front view of an end link member in which there is adopted another example of a means for preventing interference of end link members with each other.

In view of this, as a means for preventing interference of the input side end link members 1a through 3a and the output side end link members 1c through 3c in the same link, both side edge portions of a curved arm portion of each of the input and output side end link members 1a through 3a and 1c through 3c are beveled. By thus forming beveled portions 55, it is possible to further shorten the intermediate link members 1b through 3b, so that it is possible to make the entire link mechanism compact. The beveled portion 55 may be formed so as to extend over the entire arm as shown in FIG. 21, or solely at the requisite portion forming the arm curved portion as shown in FIG. 22.

Figure 23:
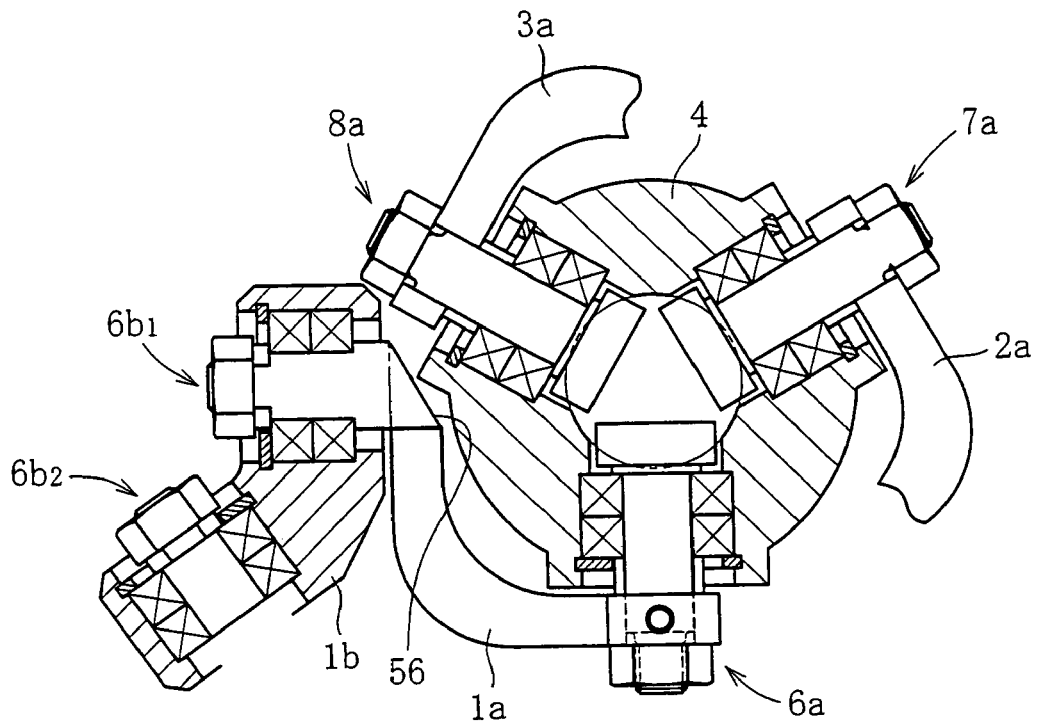
FIG. 23 is a sectional view showing an example of a means for preventing interference of the arm forward end of the end link member with the input member.

Further, in the embodiment shown in FIG. 23, in the input side end link members 1a through 3a having the rotation pair portions $6b_1$ through $8b_1$ with respect to the intermediate link members 1b through 3b, a flat portion 56 is formed on the inner side of the connecting portion of each arm forward end where each of the rotation pair portions $6b_1$ through $8b_1$ is provided. By forming the flat portion 56 described above, it is possible to prevent interference of the arm forward ends of the end link members 1a through 3a with the input member 4. Also regarding the output side end link members 1c through 3c having the rotation pair portions $6b_2$ through $8b_2$ with respect to the intermediate link members 1b through 3b, it is desirable to form the flat portion 56 on the inner side of the connecting portion of each arm forward end.

Figure 24:
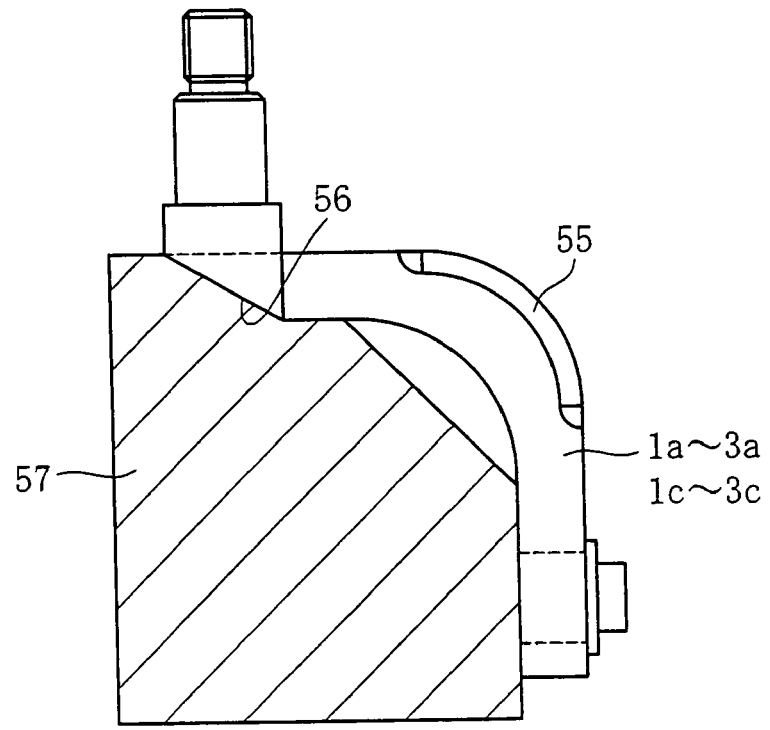
FIG. 24 is an explanatory view showing a state in which, when press-fitting a bearing into the rotation pair portion of an end link member, the end link member is fixed to a jig.

By thus forming the flat portion 56 on the inner side of the connecting portion of each arm forward end provided with the rotation pair portions $6b_1$ through $8b_1$, when, for example, press-fitting the bearings into the rotation pair portions $6b_1$ through $8b_1$ at the time of assembly of each of the link mechanisms 1 through 3, by using a jig 57 as shown in FIG. 24, each of the end link members 1a through 3a is firmly fixed by the flat portion 56 on the inner side of the connecting portion of the arm forward end. Accordingly, the press-fitting into the rotation pair portions $6b_1$ through $8b_1$ can be easily conducted.

Figure 25:
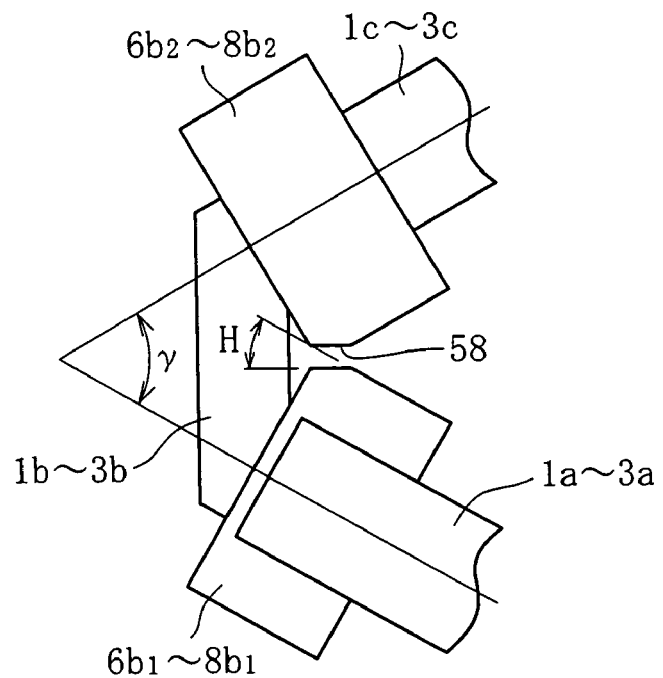
FIG. 25 is a schematic diagram showing an example of a means for preventing interference between the rotation pair portions of the input side end link member and the intermediate link member and the rotation pair portions of the output side end link member and the intermediate link member.

FIG. 25 shows an example of a means for preventing interference of the rotation pair portions $6b_1$ through $8b_1$ of the input side end link members 1a through 3a and the intermediate link members 1b through 3b with the rotation pair portions $6b_2$ through $8b_2$ of the output side end link members 1c through 3c and the intermediate link members 1b through 3b. As a means for preventing interference with each other of the rotation pair portions, the length of the intermediate link members 1b through 3b might be increased. In this case, however, there arises an increase in the size of the link mechanism as a whole.

In view of this, in the embodiment shown in FIG. 25, beveling is effected on the outer end surfaces of the rotation pair portions $6b_1$ through $8b_1$ of the input side end link members 1a through 3a and on the outer end surfaces of the rotation pair portions $6b_2$ through $8b_2$ of the output side end link members 1c through 3c. By thus forming beveled portions 58 on the rotation pair portions $6b_1$ through $8b_1$ and on the rotation pair portions $6b_2$ through $8b_2$, it is possible to shorten the intermediate link members 1b through 3b, so that it is possible to make the link mechanism as a whole further compact. In this case, it is effective for a beveling angle H to be γ/2 so that the tapered surfaces of the beveled portions 58 may become parallel to each other.

While it is possible for the beveled portions 58 to be formed over the entire periphery of the outer end surfaces of the rotation pair portions $6b_1$ through $8b_1$ and of the rotation pair portions $6b_2$ through $8b_2$, since rotation range for the end link members 1a through 3a and 1c through 3c with respect to the intermediate link members 1b through 3b is regulated by the maximum bending angle θmax that the link mechanism can assume, it is also possible to form the beveled portions 58 only in the regions of the entire periphery of the outer end surfaces of the rotation pair portions $6b_1$ through $8b_1$ and of the rotation pair portions $6b_2$ through $8b_2$ where the beveled portions 58 are needed.

Figure 26:
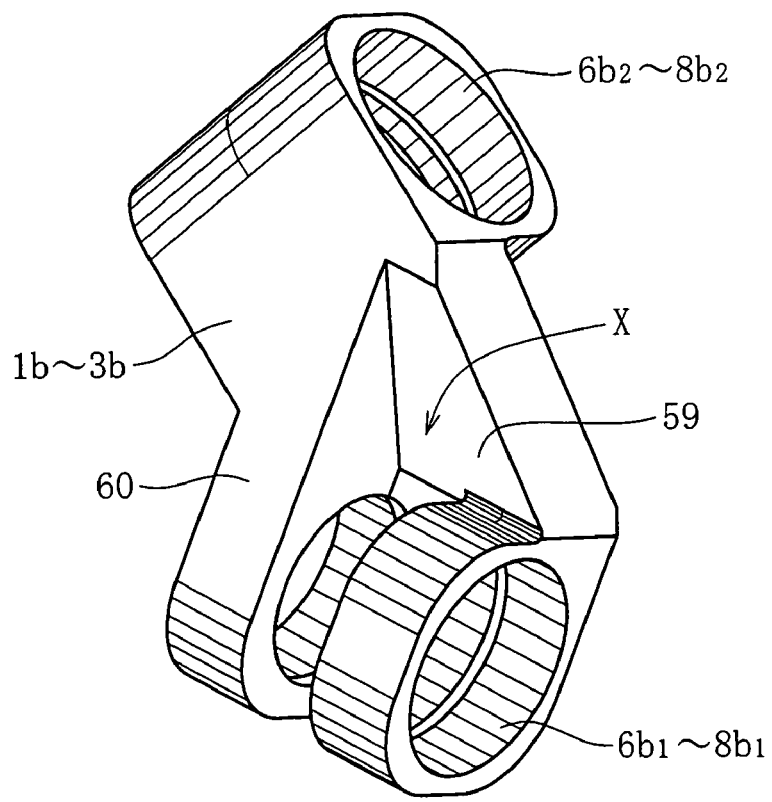
FIG. 26 is a perspective view of an intermediate link member provided with an example of a means for preventing interference of the end link member and the intermediate link member.
Figure 27:
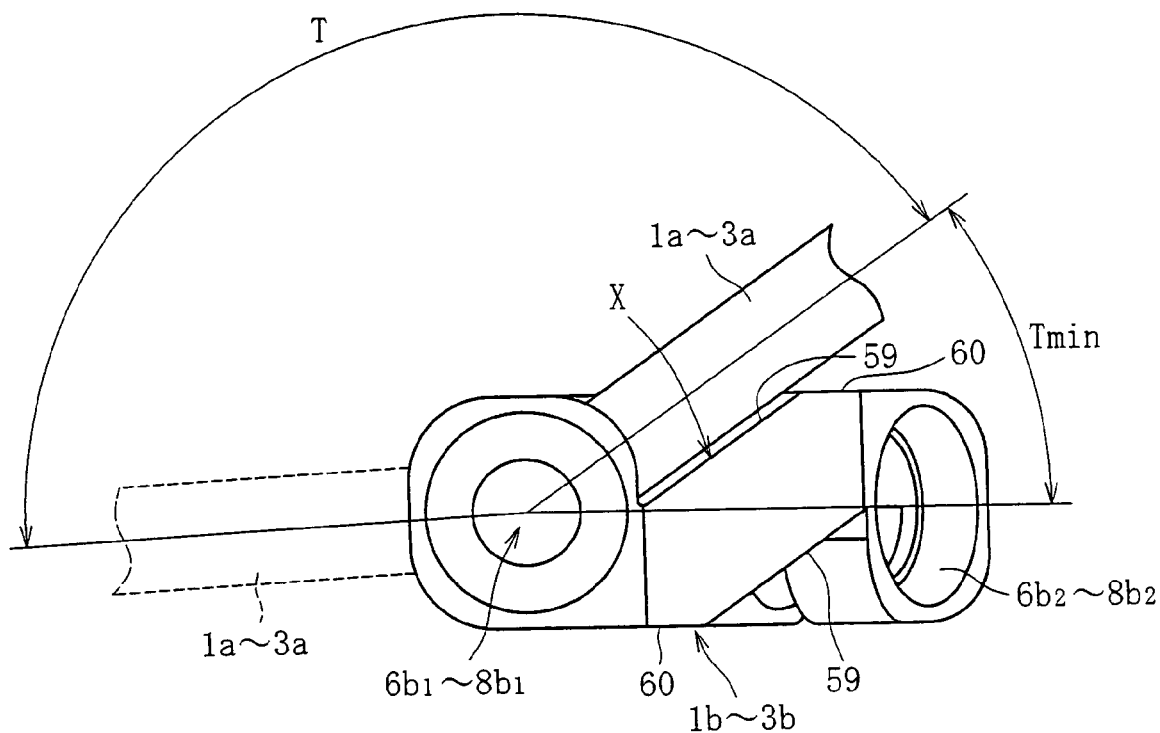
FIG. 27 is a front view illustrating the rotation range for the end link member with respect to the intermediate link member.
Figure 28:
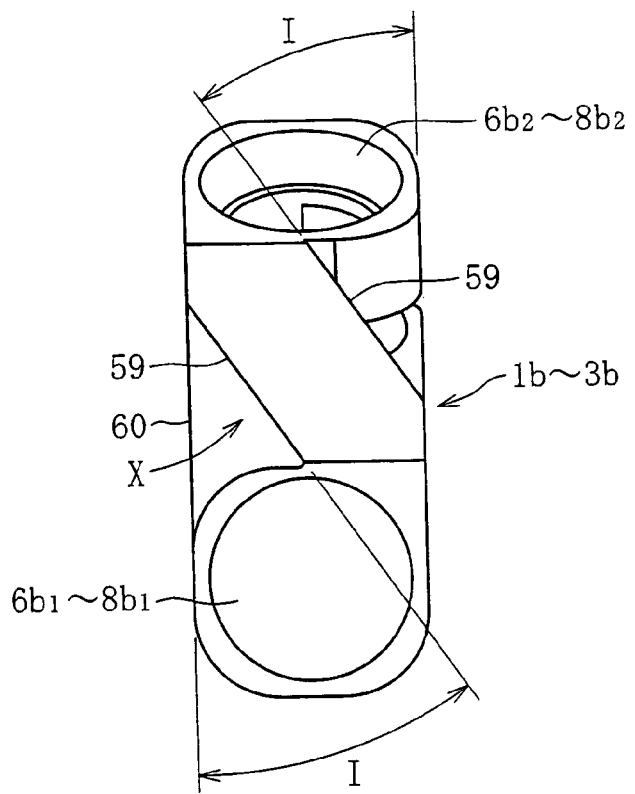
FIG. 28 is a front view of the intermediate link member of FIG. 26.

FIGS. 26 through 28 show an example of a means for preventing interference of the end link members 1a through 3a and 1c through 3c with the intermediate link members 1b through 3b, and an embodiment thereof will be described below. The embodiment to be described below is applied to the link actuating device shown in FIG. 2.

FIG. 26 shows the configuration of the intermediate link members 1b through 3b having the rotation pair portions $6b_1$ through $8b_1$ and $6b_2$ through $8b_2$ supporting the end link members 1a through 3a and 1c through 3c at both ends. As shown in FIG. 27, when each of the end link members 1a through 3a and 1c through 3c, and each of the intermediate link members 1b through 3b are brought close to each other through folding, the minimum angle Tmin made by the two members, that is, the minimum angle that each of the end link members 1a through 3a and 1c through 3c can assume with respect to the axis of each of the intermediate link members 1b through 3b connecting the two rotation pair portions $6b_1$ through $8b_1$ and $6b_2$ through $8b_2$ can be obtained from the maximum bending angle θmax that the link mechanism can assume and from the shaft angle γ of the intermediate link members 1b through 3c. That is, $Tmin=\sin^{-1}(\{\tan(\gamma/2)/\tan((\theta max+\gamma)/2)\}^{0.5})$.

Here, a rotation range T of the end link members 1a through 3a and 1c through 3c with respect to the intermediate link members 1b through 3b is represented as T=2×(90−Tmin), so that the intermediate link members 1b through 3b are slimmed by a quantity corresponding to the rotation range T of the end link members 1a through 3a and 1c through 3c (In FIG. 26, symbol X indicates the portion slimmed down). By thus slimming the intermediate link members 1b through 3b, it is possible to prevent interference of the end link members 1a through 3a and 1c through 3c with the intermediate link members 1b through 3b, and at the same time, the intermediate link members 1b through 3b can be superior also in terms of strength. Further, as shown in FIG. 28, it is effective for an angle I made by an end surface 59 of the slimmed portion X of each of the intermediate link members 1b through 3b and an end surface 60 of the non-slimmed portion thereof to be determined such that Tmin=I, where Tmin is the minimum angle at which the end link members 1a through 3a and 1c through 3c can be folded with respect to the intermediate link members 1b through 3b.

Figure 29:
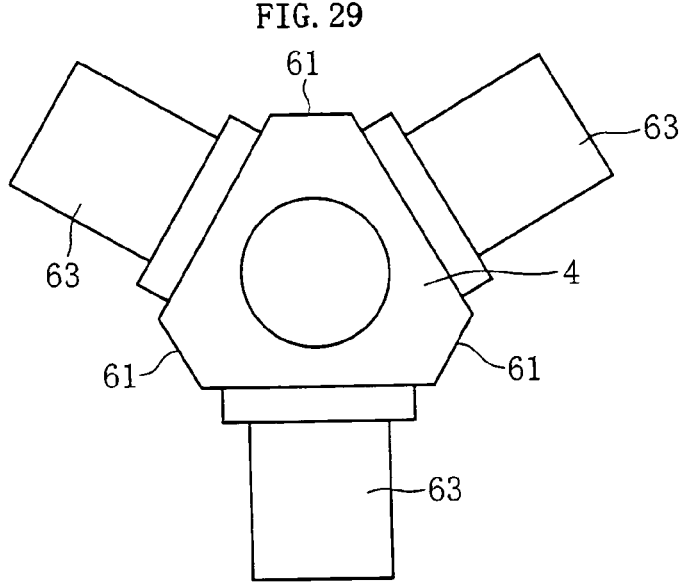
FIG. 29 is a plan view of an example of the configuration of an input member in which the assembly property of the link mechanism and workability are taken into account.
Figure 30:
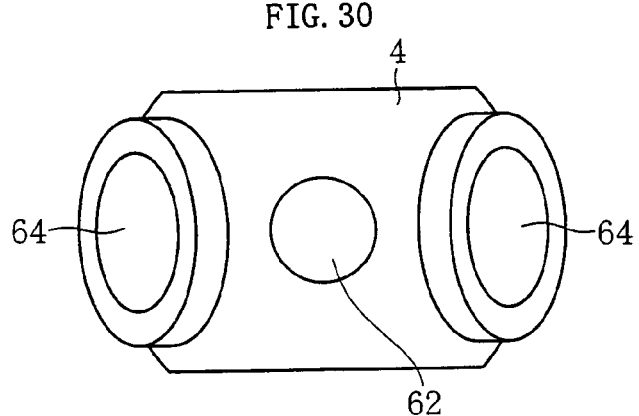
FIG. 30 is a front view of another example of the configuration of an input member in which the assembly property of the link mechanism and workability are taken into account.
Figure 31:
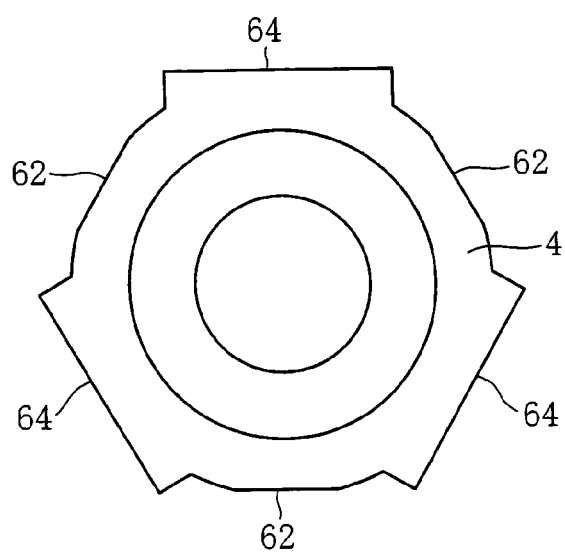
FIG. 31 is a plan view of FIG. 30.

FIGS. 29 through 31 show an example of the configuration of the input member 4 formed by taking into account the assembly property and workability of the link mechanism, and an embodiment thereof will be described below. The embodiment is applied to the link actuating device shown in FIG. 1. The embodiment is naturally also applicable to the output member 5.

In the embodiment shown in FIG. 29, regarding the input member 4 integrally formed with the shafts 63 of the rotation pair portions 6a through 8a with respect to the input side end link members 1a through 3a, in machining the shafts 63 of the rotation pair portions 6a through 8a, flat portions 61 are provided in order to maintain the input member 4 in a stable attitude and facilitate incorporation of the shafts 63 into the bearings. By thus forming the flat portions 61 on the portions of the outer peripheral surface of the input member 4 situated between the shafts 63, the machining of the shafts 63 and the incorporation thereof into the bearings are facilitated.

In the embodiments shown in FIGS. 30 and 31, in the input member 4 to which the shafts of the rotation pair portions 6a through 8a with respect to the input side end link members 1a through 3a are mounted as separate members, flat portions 62 are formed on the portions of the outer peripheral surface of the input member situated between mounting portions 64, such as through-holes, for attaching the shafts of the rotation pair portions 6a through 8a. The flat portions 62 may be formed so as to constitute vertical planes with respect to the shafts of the rotation pair portions 6a through 8a with respect to the opposing end link members. By thus forming the flat portions 62, in forming the mounting portions 64, such as through-holes, in the input member 4 by machining, it is possible to maintain the input member 4 in a stable attitude, and the incorporation of the shafts into the mounting portions 64, such as through-holes, is facilitated.

What is claimed is:

1. A link actuating device which has at least three sets of link mechanisms each including four rotation pair portions formed by rotatably connecting end link members to input and output members respectively arranged on input and output sides and rotatably connecting the end link members on the input and output sides to an intermediate link member, with the input and output sides being geometrically the same with respect to a cross section at the central portion of each link mechanism, wherein each rotation pair portion of the link mechanisms has a bearing structure composed of two bearings and a shaft inserted within and rotatably supported by the two bearings, wherein at least one of the input member and the output member has a through-hole formed in a radial direction thereof through which the shaft is inserted and having the two bearings mounted therein, and wherein a play filling-up means for regulating axial movement of the two bearings is provided in the rotation pair portion.

2. A link actuating device according to claim 1, wherein as the above-mentioned play filling-up means, a spacer is provided between the two bearings, and wherein the spacer has a thickness that is not more than double the axial gap of the bearings.

3. A link actuating device according to claim 1, wherein as the play filling-up means, a presser member pressing outer ring end portions of the bearings is mounted to the rotation pair portion.

4. A link actuating device according to claim 1, wherein as the play filling-up means, an locking portion for pre-load adjustment or positioning is formed on the shaft of the rotation pair portion.

5. A link actuating device according to claim 4, wherein the locking portion is a step formed on an outer peripheral surface of the shaft of the rotation pair portion.

6. A link actuating device according to claim 4, wherein the locking portion is a step formed on at least one position at an end of the shaft of the rotation pair portion, between the two bearings, between the bearings and the end link member, or between the bearings and a rotation transmission member.

7. A link actuating device according to claim 1, wherein the bearing structure of each rotation pair portion of the link mechanisms has the two bearings accommodated in a common housing.

8. A link actuating device according to claim 7, wherein the two bearings are arranged such that angular ball bearings are arranged back to back.

9. A link actuating device according to claim 1, wherein the two bearings are arranged in the rotation pair portion so as to support each rotation pair portion of the link mechanisms at both ends, with an end link member or an intermediate link member entering the space between the two bearings.

10. A link actuating device according to claim 1, further comprising a rotation transmission member, wherein a connecting portion between the rotation transmission member and the rotation pair portion and a connecting portion between the end link member and the rotation pair portion are formed to set the positional relationship between the end link member and the rotation transmission member.

11. A link actuating device according to claim 9, further comprising a rotation transmission member, wherein a connecting portion between the rotation transmission member and the rotation pair portion and a connecting portion between the end link member and the rotation pair portion are formed to set the positional relationship between the end link member and the rotation transmission member.

12. A link actuating device according to claim 10, wherein each of the connecting portions is constructed such that two flat portions are formed on the shaft of the rotation pair portion so as to be radially offset from each other.

13. A link actuating device according to claim 11, wherein each of the connecting portions is constructed such that two flat portions are formed on the shaft of the rotation pair portion so as to be radially offset from each other.

14. A link actuating device according to claim 1, wherein a reinforcing member is added to a shaft of the rotation pair portion provided on the input member or the output member to thereby support the rotation pair portion of the link mechanisms at both ends.

15. A link actuating device according to claim 9, wherein a reinforcing member is added to a shaft of the rotation pair portion provided on the input member or the output member to thereby support the rotation pair portion of the link mechanisms at both ends.

16. A link actuating device according to claim 10, wherein a reinforcing member is added to a shaft of the rotation pair portion provided on the input member or the output member to thereby support the rotation pair portion of the link mechanisms at both ends.

17. A link actuating device according to any one of claims 11 through 13, wherein a reinforcing member is added to a shaft of the rotation pair portion provided on the input member or the output member to thereby support the rotation pair portion of the link mechanisms at both ends.

18. A link actuating device according to claim 1, wherein the rotation pair portion is a bearing with a shafted inner ring allowing pre-load adjustment or play filling-up.

19. A link actuating device according to claim 18, wherein an outer ring of the bearing with the shafted inner ring is equipped with a flange.

20. A link actuating device which has at least three sets of link mechanisms each including four rotation pair portions formed by rotatably connecting end link members to input and output members respectively arranged on input and output sides and rotatably connecting the end link members on the input and output sides to an intermediate link member, with the input and output sides being geometrically the same with respect to a cross section at the central portion of each link mechanism, wherein at least one of the input member and output member is provided with a spacer for preventing the end link member from interfering with the outer peripheral surface of at least one of the input or output side rotation pair portion, wherein, of the components of each link mechanism comprising the input and output members and the end link member or the intermediate link member, at least one component has such a configuration that prevents interference with other components during operation of the link mechanisms, and wherein a distance between the outer end surface of the intermediate link side rotation pair portion of the end link member and the axial center of at least one of the input or output side rotation pair portion is R, a rotation angle at which the end link member comes closest to at least one of the input or output member is E, and a distance from the surface joined to the spacer to the axial center of the said at least one of input or output side rotation pair portion of the end link member is D, a thickness G of the spacer is determined so as to satisfy the condition: $G \geq \{R \cdot \sin(E) + B \cdot \cos(E)\} - D$.

21. A link actuating device according to claim 20, wherein a beveled portion for preventing interference of the end link member with the outer peripheral surface of the intermediate link side rotation pair portion is formed on the link-side outer peripheral edge portion of the input member or the output member.

22. A link actuating device according to claim 21, wherein the beveled portion has a tapered surface with a beveling angle F which satisfies the condition: $F = (\theta max - \gamma)/2$, where $\theta max$ is a maximum bending angle of the link mechanisms, and $\gamma$ is a shaft angle of the intermediate link member.

23. A link actuating device according to claim 20, wherein, a distance between the inner end surface of the intermediate link side rotation pair portion of the end link member and the axial center of the input/output side rotation pair portion is S, and a distance between the outer peripheral surface of the intermediate link side rotation pair portion of the end link member and the axis of the intermediate link side rotation pair portion is B, the configuration of the input/output member is, based on a rotation angle $E = (\theta max - \gamma)/2$ at which the end link member comes closest to the input/output member, determined such that an outer dimension Q for preventing interference of the end link member with the outer peripheral surface of the intermediate link side rotation pair portion satisfies the condition: $Q \leq \{S - B \cdot \tan(E)\} \cdot \cos(E)$.

24. A link actuating device according to claim 20, wherein the end link member has a curved arm-shaped configuration, and wherein a beveled portion for preventing interference between the input and output side end link members in the same link is formed on the outer edge portion of the curved portion thereof.

25. A link actuating device according to claim 20, wherein a beveled portion is formed on each of the outer end surfaces of the intermediate link side rotation pair portion of the input side end link and the intermediate link side rotation pair portion of the output side end link member, for preventing interference between the rotation pair portions of the two end link members.

26. A link actuating device according to claim 25, wherein, a shaft angle of the intermediate link member is $\gamma$, and the beveled portion has a tapered surface satisfying the condition: $H = \gamma/2$, where H is the beveling angle.

27. A link actuating device according to claim 20, wherein the intermediate link member with the rotation pair portion supporting the end link member at both ends is partially slimmed down in conformity with the rotation range of the end link member with respect to the intermediate link member, forming a slimmed portion for preventing interference between the intermediate link member and the end link member.

28. A link actuating device according to claim 27, wherein the slimmed portion has a tapered surface at a minimum angle Tmin that the intermediate link member and the end link member form when folded together.

29. A link actuating device according to claim 28, wherein the minimum angle Tmin is obtained by:
Tmin=$\sin^{-1}(\{\tan(\gamma/2)/\tan((\theta max+\gamma/2)\}^{0.5})$, where $\theta max$ is a maximum bending angle of the link mechanism and $\gamma$ is a shaft angle of the intermediate link member.

30. A link actuating device according to claim 28, wherein a rotation range T for the end link member with respect to the intermediate link member is obtained as follows: $T = 2 \times (90 - Tmin)$.

31. A link actuating device which has at least three sets of link mechanisms each including four rotation pair portions formed by rotatably connecting end link members to input and output members respectively arranged on input and output sides and rotatably connecting the end link members on the input and output sides to an intermediate link member, the input and output sides being geometrically the same with respect to a cross section at the central portion of each link mechanism, wherein a shaft extends from an outer side of a connecting portion of at least one of the end link members for rotatably connecting to the intermediate link member, and wherein at least one flat portion is provided on at least one of an inner side of the connecting portion in line with the shaft to form a tapered forward end of the at least one of the end link members and a peripheral surface of at least one of the input member and output member between where the rotation pair portions related to the end link members connect to the input member or the output member.

32. A link actuating device according to claim 31, wherein the end link member has a curved arm-shaped configuration.

33. A link actuating device according to claim 31, wherein the flat portion formed on the outer peripheral surface of the input member or the output member on a portion between where the rotation pair portions related to the end link members connect to the input member or output member, constitutes a vertical flat surface with respect to the rotation pair portion and the opposing end link member.

* * * * *